(12) United States Patent
Nagatsuka et al.

(10) Patent No.: US 12,457,732 B2
(45) Date of Patent: Oct. 28, 2025

(54) MEMORY CELL AND MEMORY DEVICE

(71) Applicant: SEMICONDUCTOR ENERGY LABORATORY CO., LTD., Atsugi (JP)

(72) Inventors: Shuhei Nagatsuka, Kanagawa (JP); Tatsuya Onuki, Kanagawa (JP); Shunpei Yamazaki, Tokyo (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 590 days.

(21) Appl. No.: 17/635,740

(22) PCT Filed: Aug. 11, 2020

(86) PCT No.: PCT/IB2020/057527
§ 371 (c)(1),
(2) Date: Feb. 16, 2022

(87) PCT Pub. No.: WO2021/033075
PCT Pub. Date: Feb. 25, 2021

(65) Prior Publication Data
US 2022/0310616 A1 Sep. 29, 2022

(30) Foreign Application Priority Data
Aug. 22, 2019 (JP) .................... 2019-151814

(51) Int. Cl.
*H10B 12/00* (2023.01)
*G11C 5/10* (2006.01)
(Continued)

(52) U.S. Cl.
CPC .............. *H10B 12/30* (2023.02); *G11C 5/10* (2013.01); *H01L 23/5226* (2013.01); *H01L 23/5283* (2013.01)

(58) Field of Classification Search
CPC ... G11C 11/405; G11C 11/4097; G11C 5/025; G11C 5/10; G11C 8/14; H01L 23/481;
(Continued)

(56) References Cited

U.S. PATENT DOCUMENTS 5,646,870 A * 7/1997 Krivokapic ...... G05B 19/41875
703/2
6,392,942 B2 5/2002 Noda et al.
(Continued)

FOREIGN PATENT DOCUMENTS

JP 2007-123861 A 5/2007
JP 2011-151383 A 8/2011
(Continued)

OTHER PUBLICATIONS

International Search Report (Application No. PCT/IB2020/057527) Dated Nov. 10, 2020.
(Continued)

*Primary Examiner* — Britt D Hanley
*Assistant Examiner* — Kevin Quinto
(74) *Attorney, Agent, or Firm* — Fish & Richardson P.C.

(57) ABSTRACT

A memory device occupying a small area is provided. In a memory cell including a reading transistor, a writing transistor, and a capacitor, the writing transistor is provided above the reading transistor. Alternatively, the reading transistor is provided above the writing transistor. An oxide semiconductor is used for a semiconductor layer where a channel of the writing transistor is formed. An oxide semiconductor is used for a semiconductor layer where a channel of the reading transistor is formed. Memory cells are arranged in a matrix.

10 Claims, 13 Drawing Sheets

(51) Int. Cl.
*H01L 23/522* (2006.01)
*H01L 23/528* (2006.01)

(58) Field of Classification Search
CPC ............. H01L 23/5223; H01L 23/5226; H01L 23/5283; H01L 27/105; H01L 29/78648; H01L 29/7869; H01L 29/78696; H10B 12/00; H10B 12/30; H10B 41/70; H10D 30/6734; H10D 30/6755; H10D 30/6757; H10D 84/80
See application file for complete search history.

(56) References Cited

U.S. PATENT DOCUMENTS

| | | | |
|---|---|---|---|
| 7,674,650 | B2 | 3/2010 | Akimoto et al. |
| 7,898,893 | B2 | 3/2011 | Park et al. |
| 8,455,868 | B2 | 6/2013 | Yamazaki et al. |
| 8,611,121 | B2 | 12/2013 | Ahn et al. |
| 9,276,121 | B2 | 3/2016 | Yamazaki |
| 9,542,977 | B2 | 1/2017 | Onuki et al. |
| 9,570,116 | B2 | 2/2017 | Kato |
| 9,634,097 | B2 | 4/2017 | Rabkin et al. |
| 9,653,611 | B2 | 5/2017 | Atsumi et al. |
| 9,748,274 | B2 | 8/2017 | Ishizu et al. |
| 9,990,997 | B2 | 6/2018 | Matsuzaki et al. |
| 10,304,523 | B2 | 5/2019 | Kato et al. |
| 10,522,693 | B2 | 12/2019 | Kurokawa |
| 10,593,683 | B2 | 3/2020 | Atsumi et al. |
| 11,114,449 | B2 | 9/2021 | Atsumi et al. |
| 2001/0013659 | A1 | 8/2001 | Noda et al. |
| 2009/0086525 | A1 | 4/2009 | Park et al. |
| 2010/0309705 | A1 | 12/2010 | Ahn et al. |
| 2011/0065270 | A1 | 3/2011 | Shim et al. |
| 2012/0063208 | A1 | 3/2012 | Koyama et al. |
| 2013/0270563 | A1* | 10/2013 | Yamazaki ............ H01L 29/4908 438/151 |
| 2014/0191328 | A1* | 7/2014 | Tsuruta ............... H10B 12/50 257/371 |
| 2015/0255139 | A1 | 9/2015 | Atsumi et al. |
| 2015/0263007 | A1* | 9/2015 | Yamazaki ......... H10D 30/6734 257/43 |
| 2016/0351243 | A1 | 12/2016 | Ishizu et al. |
| 2017/0017416 | A1* | 1/2017 | Zhou ..................... H01L 27/06 |
| 2017/0243874 | A1 | 8/2017 | Atsumi et al. |
| 2019/0189622 | A1 | 6/2019 | Atsumi et al. |
| 2020/0342928 | A1 | 10/2020 | Yamazaki et al. |
| 2021/0134847 | A1 | 5/2021 | Yamazaki et al. |
| 2021/0398988 | A1 | 12/2021 | Atsumi et al. |
| 2022/0085019 | A1 | 3/2022 | Kunitake et al. |
| 2022/0085020 | A1 | 3/2022 | Nagatsuka et al. |
| 2022/0085073 | A1 | 3/2022 | Onuki et al. |
| 2022/0093600 | A1 | 3/2022 | Onuki et al. |

FOREIGN PATENT DOCUMENTS

| | | |
|---|---|---|
| JP | 2015-181159 A | 10/2015 |
| JP | 2016-115387 A | 6/2016 |
| JP | 2016-127117 A | 7/2016 |
| JP | 2016-136622 A | 7/2016 |
| JP | 2016-225617 A | 12/2016 |
| JP | 2017-168809 A | 9/2017 |
| JP | 2018-037675 A | 3/2018 |
| JP | 2019-110302 A | 7/2019 |
| JP | 2020-036023 A | 3/2020 |
| KR | 2016-0138910 A | 12/2016 |
| WO | WO-2017/068478 | 4/2017 |

OTHER PUBLICATIONS

Written Opinion (Application No. PCT/IB2020/057527) Dated Nov. 10, 2020.

* cited by examiner

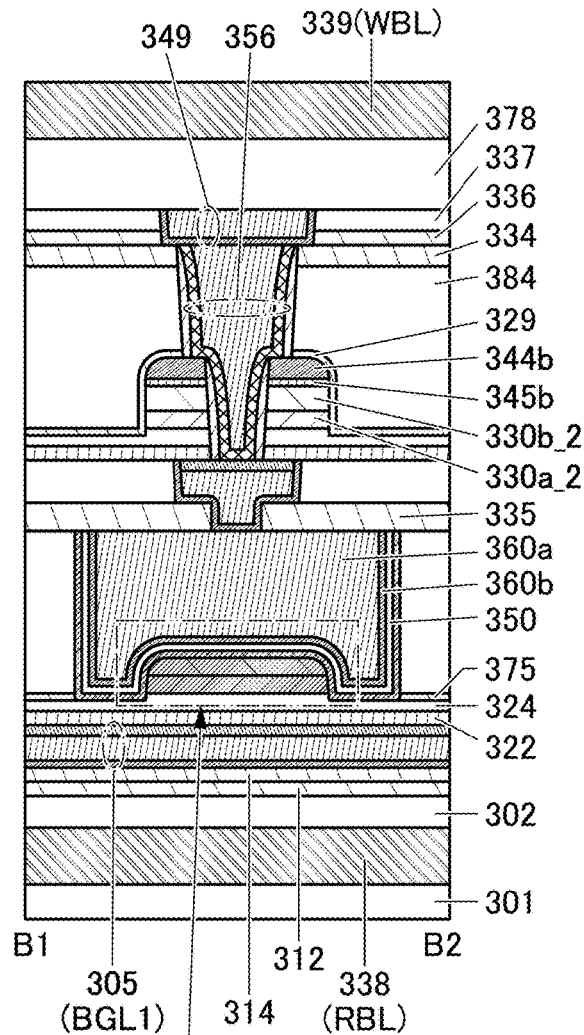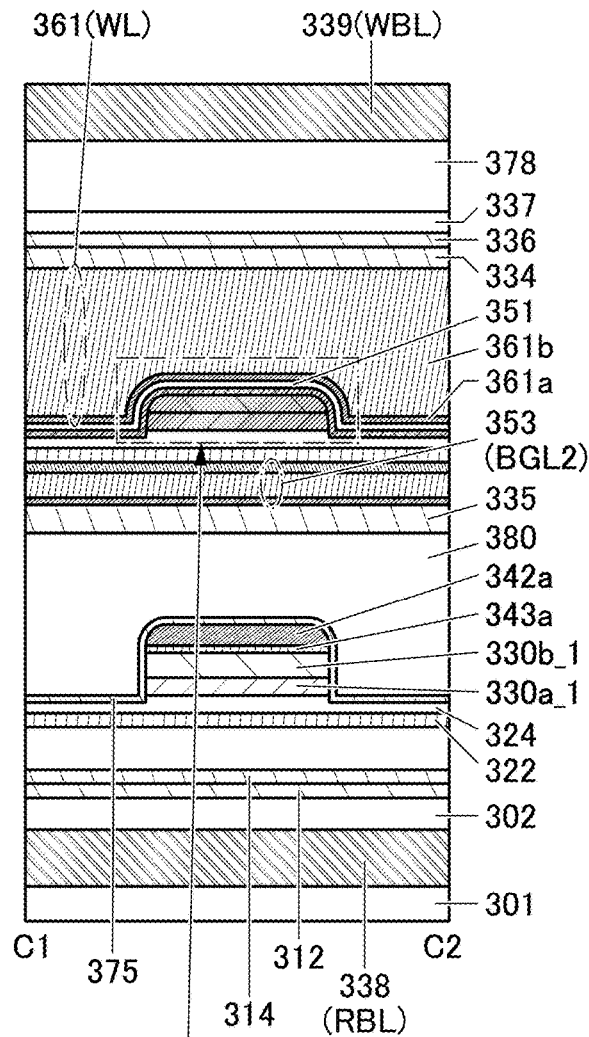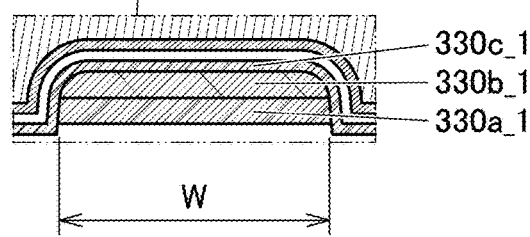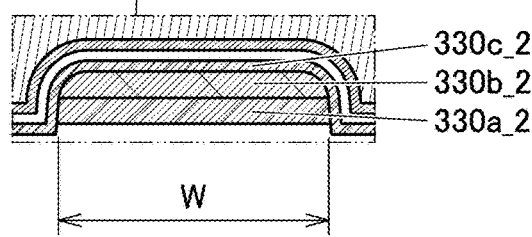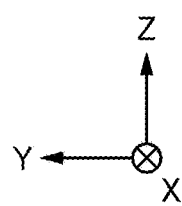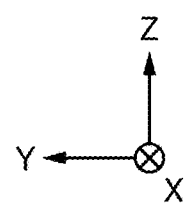

FIG. 6A
Intermediate state
New crystalline phase
| Amorphous | Crystalline | Crystal |
|---|---|---|
| • completely amorphous | • CAAC<br>• nc<br>• CAC<br><br>excluding single crystal and poly crystal | • single crystal<br>• poly crystal |
FIG. 6B
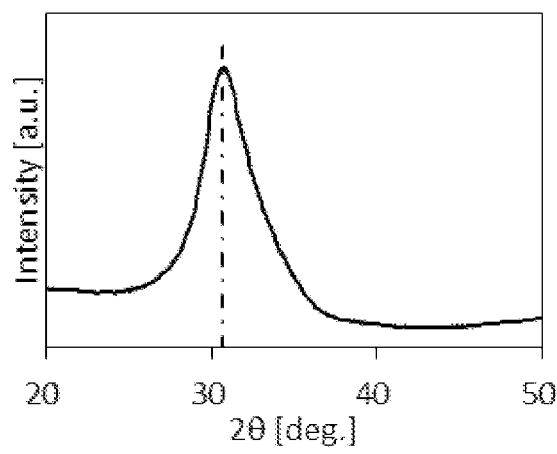
FIG. 6C
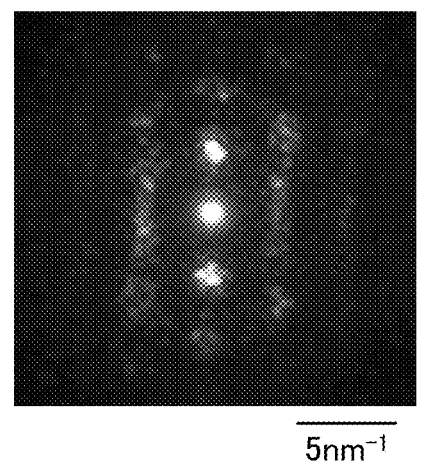

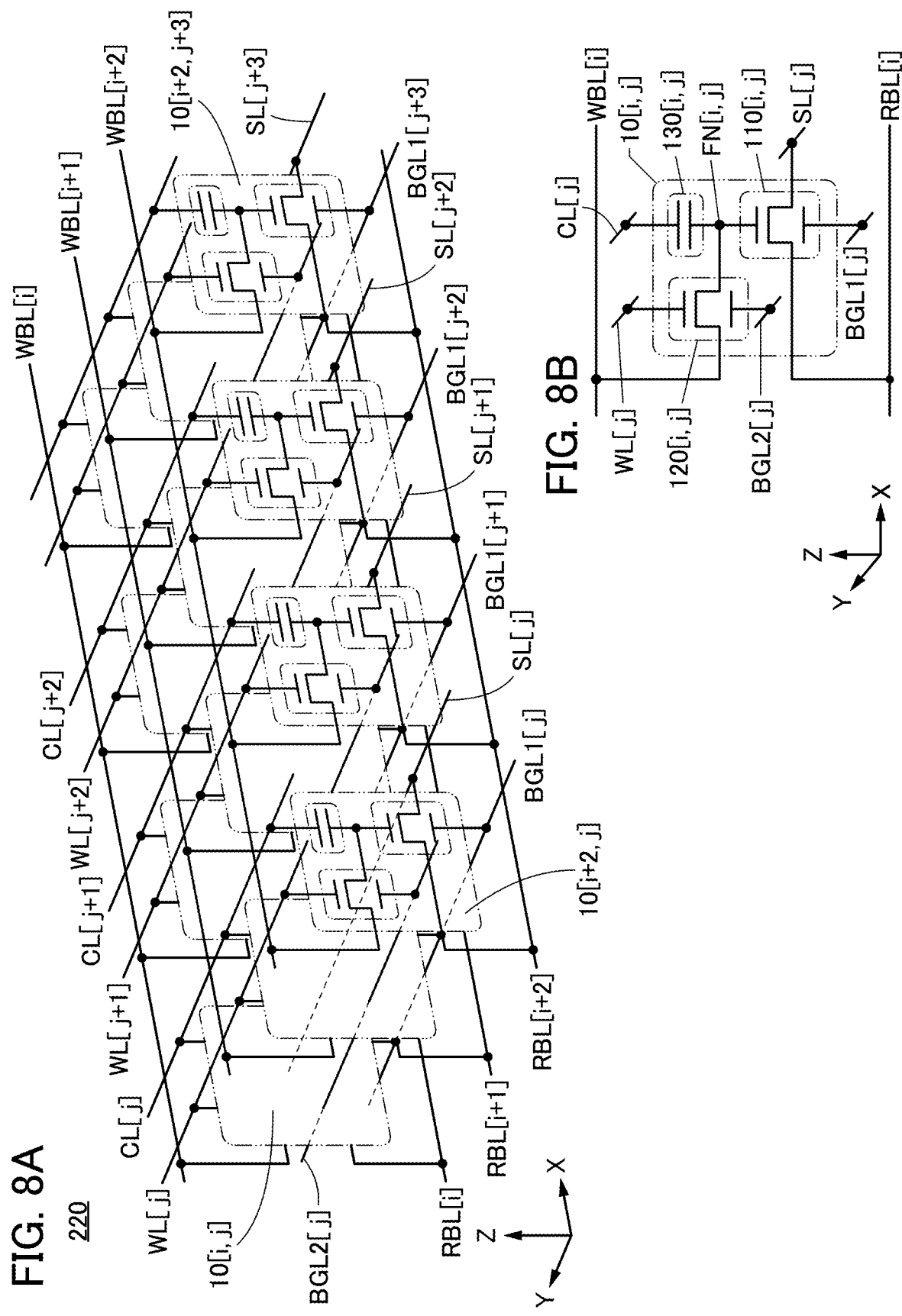

MEMORY CELL AND MEMORY DEVICE

CROSS REFERENCE TO RELATED APPLICATIONS

This application is a U.S. National Phase Application under 35 U.S.C. § 371 of International Application PCT/IB2020/057527, filed on Aug. 11, 2020, which is incorporated by reference and claims the benefit of a foreign priority application filed in Japan on Aug. 22, 2019, as Application No. 2019-151814.

TECHNICAL FIELD

One embodiment of the present invention relates to a semiconductor device.

Note that one embodiment of the present invention is not limited to the above technical field. The technical field of the invention disclosed in this specification and the like relates to an object, a method, or a manufacturing method. One embodiment of the present invention relates to a process, a machine, manufacture, or a composition of matter.

Note that in this specification and the like, a semiconductor device generally means a device that can function by utilizing semiconductor characteristics. Thus, a semiconductor element such as a transistor or a diode and a circuit including a semiconductor element are semiconductor devices. A display device, a light-emitting device, a lighting device, an electro-optical device, a memory device, an imaging device, a communication device, an electronic device, and the like may include a semiconductor element or a semiconductor circuit. A display device, a light-emitting device, a lighting device, an electro-optical device, a memory device, an imaging device, a communication device, an electronic device, and the like may be referred to as a semiconductor device.

BACKGROUND ART

In recent years, transistors using oxide semiconductors or metal oxides in their channel formation regions (Oxide Semiconductor transistors, hereinafter referred to as OS transistors) have attracted attention (Patent Document 1).

OS transistors have an extremely low off-state current. By utilizing this fact, OS transistors are used in nonvolatile memories, which is disclosed in Patent Documents 2 and 3. The nonvolatile memory using an OS transistor does not have a limit on the number of times of data rewriting and consumes low power in data rewriting. Patent Document 3 discloses an example in which a memory cell in a nonvolatile memory includes only OS transistors.

Note that in this specification, the nonvolatile memory including the OS transistor is sometimes referred to as a NOSRAM (registered trademark). The NOSRAM stands for "nonvolatile oxide semiconductor RAM", which is a RAM including a gain cell (2T or 3T) memory cell.

REFERENCE

Patent Documents

[Patent Document 1] Japanese Published Patent Application No. 2007-123861
[Patent Document 2] Japanese Published Patent Application No. 2011-151383
[Patent Document 3] Japanese Published Patent Application No. 2016-115387

SUMMARY OF THE INVENTION

Problems to be Solved by the Invention

An object of one embodiment of the present invention is to provide a memory device occupying a small area. Another object of one embodiment of the present invention is to provide a highly reliable memory device. Another object of one embodiment of the present invention is to provide a memory device with high storage capacity. Another object of one embodiment of the present invention is to provide a memory device manufactured at low cost. Another object of one embodiment of the present invention is to provide a highly reliable semiconductor device. Another object of one embodiment of the present invention is to provide a semiconductor device manufactured at low cost. Another object of one embodiment of the present invention is to provide a novel semiconductor device.

Note that the description of these objects does not preclude the existence of other objects. In one embodiment of the present invention, there is no need to achieve all the objects. Other objects will be apparent from and can be derived from the description of the specification, the drawings, the claims, and the like.

Means for Solving the Problems

One embodiment of the present invention is a memory cell which includes a reading transistor, a writing transistor, and a capacitor, in which the writing transistor is provided above the reading transistor. Alternatively, the reading transistor may be provided above the writing transistor. An oxide semiconductor is used for a semiconductor layer where a channel of the writing transistor is formed. An oxide semiconductor is preferably used for a semiconductor layer where a channel of the reading transistor is formed. A plurality of memory cells are preferably arranged in a matrix.

Another embodiment of the present invention is a memory cell including a first transistor, a second transistor, and a capacitor. One of a source and a drain of the first transistor is electrically connected to a first wiring. The other of the source and the drain of the first transistor is electrically connected to a second wiring. One of a source and a drain of the second transistor is electrically connected to a third wiring. The other of the source and the drain of the second transistor is electrically connected to a gate of the first transistor. A gate of the second transistor is electrically connected to a fourth wiring. The capacitor is positioned between the gate of the first transistor and a fifth wiring. The second transistor is positioned above the first transistor. The first transistor includes a first oxide semiconductor. The second transistor includes a second oxide semiconductor.

The channel length of the first transistor is preferably longer than the channel length of the second transistor.

Another embodiment of the present invention is a memory device including a plurality of the memory cells, and m first wirings and n fourth wirings. The plurality of memory cells are arranged in a matrix of m rows and n columns (each of m and n is an integer greater than or equal to 2). The i-th (i is an integer greater than or equal to 1 and less than or equal to m) first wiring is electrically connected to the i-th memory cell. The j-th (j is an integer greater than or equal to 1 and less than or equal to n) fourth wiring is electrically connected to the j-th memory cell.

The first oxide semiconductor preferably includes at least one of indium and zinc. The second oxide semiconductor preferably includes at least one of indium and zinc. The first transistor preferably includes a back gate. The second transistor preferably includes a back gate.

Effect of the Invention

One embodiment of the present invention can provide a memory device occupying a small area. One embodiment of the present invention can provide a highly reliable memory device. One embodiment of the present invention can provide a memory device with high storage capacity. One embodiment of the present invention can provide a memory device manufactured at low cost. One embodiment of the present invention can provide a highly reliable semiconductor device. One embodiment of the present invention can provide a semiconductor device manufactured at low cost. One embodiment of the present invention can provide a novel semiconductor device.

Note that the description of these effects does not preclude the existence of other effects. One embodiment of the present invention does not have to have all these effects. Other effects will be apparent from and can be derived from the description of the specification, the drawings, the claims, and the like.

BRIEF DESCRIPTION OF THE DRAWINGS

FIG. 4A and FIG. 4B are cross-sectional views of a memory cell.

FIG. 6A illustrates classification of crystal structures of oxide semiconductors. FIG. 6B is a graph showing an XRD spectrum of a CAAC-IGZO film. FIG. 6C is an image showing a nanobeam electron diffraction pattern of a CAAC-IGZO film.

FIG. 8A is a block diagram illustrating a structure example of a cell array. FIG. 8B is a circuit diagram of a memory cell.

MODE FOR CARRYING OUT THE INVENTION

Figure 1A:
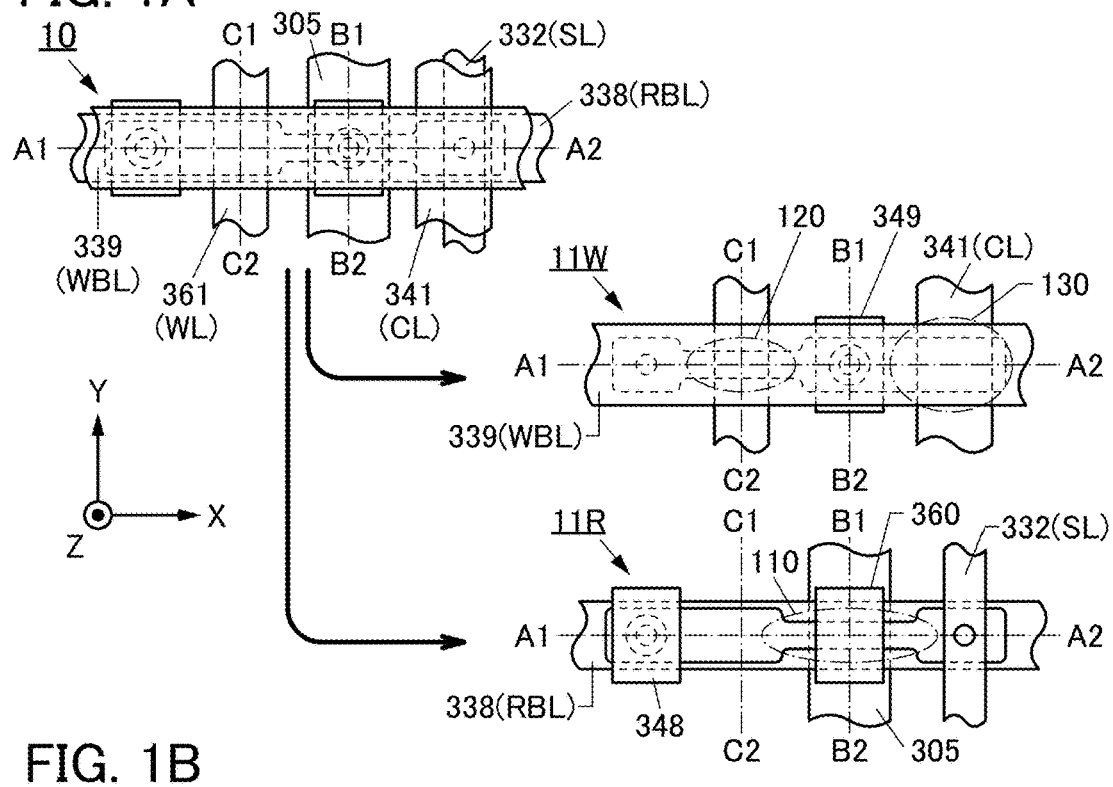
FIG. 1A is a plan view of a memory cell.

Embodiments are described in detail with reference to the drawings. However, the present invention is not limited to the following description, and it is readily appreciated by those skilled in the art that modes and details can be modified in various ways without departing from the spirit and the scope of the present invention. Thus, the present invention should not be construed as being limited to the description in the following embodiments. Note that in the structures of the invention described below, the same portions or portions having similar functions are denoted by the same reference numerals in different drawings, and description thereof is not repeated.

The position, size, range, and the like of each component illustrated in the drawings and the like do not represent the actual position, size, range, and the like in some cases to facilitate understanding of the invention. Therefore, the disclosed invention is not necessarily limited to the position, size, range, or the like disclosed in drawings and the like. For example, in the actual manufacturing process, a resist mask or the like might be unintentionally reduced in size by treatment such as etching, which is not illustrated in some cases for easy understanding.

In drawings and the like, some components might be omitted for easy understanding of the explanation.

In addition, in this specification and the like, the terms "electrode" and "wiring" do not functionally limit these components. For example, an "electrode" is used as part of a "wiring" in some cases, and vice versa. Furthermore, the term "electrode" or "wiring" also includes the case where a plurality of "electrodes" or "wirings" are formed in an integrated manner, for example.

In this specification and the like, a "terminal" in an electric circuit refers to a portion that inputs or outputs a current or a voltage or receives or transmits a signal. Accordingly, part of a wiring or an electrode functions as a terminal in some cases.

Note that the term "over" or "under" in this specification and the like does not necessarily mean that a component is placed directly over and in contact with or directly under and in contact with another component. For example, the expression "an electrode B over an insulating layer A" does not necessarily mean that the electrode B is formed over and in direct contact with the insulating layer A, and does not exclude the case where another component is provided between the insulating layer A and the electrode B.

Furthermore, functions of a source and a drain are interchanged with each other depending on operation conditions, for example, when a transistor of different polarity is employed or when the direction of current flow is changed in circuit operation; therefore, it is difficult to define which is the source or the drain. Thus, the terms "source" and "drain" can be interchanged with each other in this specification.

In this specification and the like, the expression "electrically connected" includes the case where components are directly connected to each other and the case where components are connected through an "object having any electric function." There is no particular limitation on the "object having any electric function" as long as electric signals can be transmitted and received between components that are connected through the object. Thus, even when the expression "electrically connected" is used, there is a case where no physical connection is made and a wiring just extends in an actual circuit.

In this specification and the like, "parallel" indicates a state where two straight lines are placed at an angle of greater than or equal to −10° and less than or equal to 10°, for example. Accordingly, the case where the angle is greater than or equal to −5° and less than or equal to 5° is also included. Furthermore, the terms "perpendicular" and "orthogonal" indicate a state where two straight lines are placed at an angle of greater than or equal to 80° and less than or equal to 100°, for example. Accordingly, the case where the angle is greater than or equal to 85° and less than or equal to 95° is also included.

In this specification and the like, the terms "identical", "same", "equal", "uniform", and the like used in describing calculation values and measurement values or in describing objects, methods, events, and the like that can be converted into calculation values or measurement values allow for a margin of error of ±20% unless otherwise specified.

The term "adjacent" or "proximity" in this specification and the like does not necessarily mean that a component is directly in contact with another component. For example, the expression "an electrode B adjacent to an insulating layer A" does not necessarily mean that the insulating layer A and the electrode B are formed in direct contact with each other, and does not exclude the case where another component is placed between the insulating layer A and the electrode B.

A voltage refers to a potential difference between a given potential and a reference potential (e.g., a ground potential or a source potential) in many cases. Therefore, the terms "voltage" and "potential" can be replaced with each other in many cases. In this specification and the like, "voltage" and "potential" can be replaced with each other unless otherwise specified.

Note that a "semiconductor" has characteristics of an "insulator" when the conductivity is sufficiently low, for example. Thus, a "semiconductor" can be replaced with an "insulator." In that case, a "semiconductor" and an "insulator" cannot be strictly distinguished from each other because a border therebetween is not clear. Accordingly, a "semiconductor" and an "insulator" in this specification can be replaced with each other in some cases.

Furthermore, a "semiconductor" has characteristics of a "conductor" when the conductivity is sufficiently high, for example. Thus, a "semiconductor" can be replaced with a "conductor." In that case, a "semiconductor" and a "conductor" cannot be strictly distinguished from each other because a border therebetween is not clear. Accordingly, a "semiconductor" and a "conductor" in this specification can be replaced with each other in some cases.

Note that ordinal numbers such as "first" and "second" in this specification and the like are used in order to avoid confusion among components and do not denote the priority or the order such as the order of steps or the stacking order. A term without an ordinal number in this specification and the like might be provided with an ordinal number in the scope of claims in order to avoid confusion among components. Furthermore, a term with an ordinal number in this specification and the like might be provided with a different ordinal number in the scope of claims. Furthermore, even when a term is provided with an ordinal number in this specification and the like, the ordinal number might be omitted in the scope of claims and the like.

Note that in this specification and the like, an "on state" of a transistor refers to a state in which a source and a drain of the transistor are regarded as being electrically short-circuited (also referred to as a "conducting state"). Furthermore, an "off state" of a transistor refers to a state in which a source and a drain of the transistor are regarded as being electrically disconnected (also referred to as a "non-conducting state").

In this specification and the like, in some cases, "on-state current" means a current that flows between a source and a drain when a transistor is in an on state. Furthermore, in some cases, "off-state current" means a current that flows between a source and a drain when a transistor is in an off state.

In this specification and the like, a high power supply potential VDD (hereinafter, also simply referred to as "VDD", "H potential", or "H") is a power supply potential higher than a low power supply potential VSS (hereinafter, also simply referred to as "VSS," "L potential," or "L"). VSS refers to a power supply potential at a potential lower than VDD. A ground potential (hereinafter, also simply referred to as "GND" or "GND potential") can be used as VDD or VSS. For example, in the case where VDD is a ground potential, VSS is a potential lower than the ground potential, and in the case where VSS is a ground potential, VDD is a potential higher than the ground potential.

Unless otherwise specified, transistors described in this specification and the like are enhancement (normally-off) n-channel field-effect transistors. Thus, the threshold voltage (also referred to as "Vth") is higher than 0 V. Furthermore, unless otherwise specified, "an H potential is supplied to a gate of a transistor" means that "the transistor is brought into an on state" in some cases. Also, unless otherwise specified, "an L potential is supplied to a gate of a transistor" means that "the transistor is brought into an off state" in some cases.

In this specification and the like, a gate refers to part or the whole of a gate electrode and a gate wiring. A gate wiring refers to a wiring for electrically connecting at least one gate electrode of a transistor to another electrode or another wiring.

In this specification and the like, a source refers to part or the whole of a source region, a source electrode, and a source wiring. A source region refers to a region in a semiconductor layer, where the resistivity is lower than or equal to a given value. A source electrode refers to part of a conductive layer that is connected to a source region. A source wiring refers to a wiring for electrically connecting at least one source electrode of a transistor to another electrode or another wiring.

In this specification and the like, a drain refers to part or the whole of a drain region, a drain electrode, and a drain wiring. A drain region refers to a region in a semiconductor layer, where the resistivity is lower than or equal to a given value. A drain electrode refers to part of a conductive layer that is connected to a drain region. A drain wiring refers to a wiring for electrically connecting at least one drain electrode of a transistor to another electrode or another wiring.

In the drawings and the like, for easy understanding of the potentials of a wiring, an electrode, and the like, "H" representing an H potential or "L" representing an L potential is sometimes written near the wiring, the electrode, and the like. In addition, enclosed "H" or "L" is sometimes written near a wiring, an electrode, and the like whose potential has changed. Moreover, a symbol "x" is sometimes written on a transistor in an off state.

In general, a "capacitor" has a structure in which two electrodes face each other with an insulator (dielectric) therebetween. This specification and the like include a case where a "capacitor element" is the above-described "capacitor." That is, this specification and the like include cases where a "capacitor element" is one having a structure in which two electrodes face each other with an insulator therebetween, one having a structure in which two wirings face each other with an insulator therebetween, or one in which two wirings are positioned with an insulator therebetween.

In this specification and the like, when a plurality of components are denoted by the same reference sign, and in particular need to be distinguished from each other, an identification numeral such as "_1," "_2," "[n]", or "[m,n]" is sometimes added to the reference sign. For example, the second wiring GL may be expressed as a wiring GL[2].

Embodiment 1

A configuration example of a memory cell 10, which is a memory device of one embodiment of the present invention, will be described with reference to drawings.

Figure 1B:
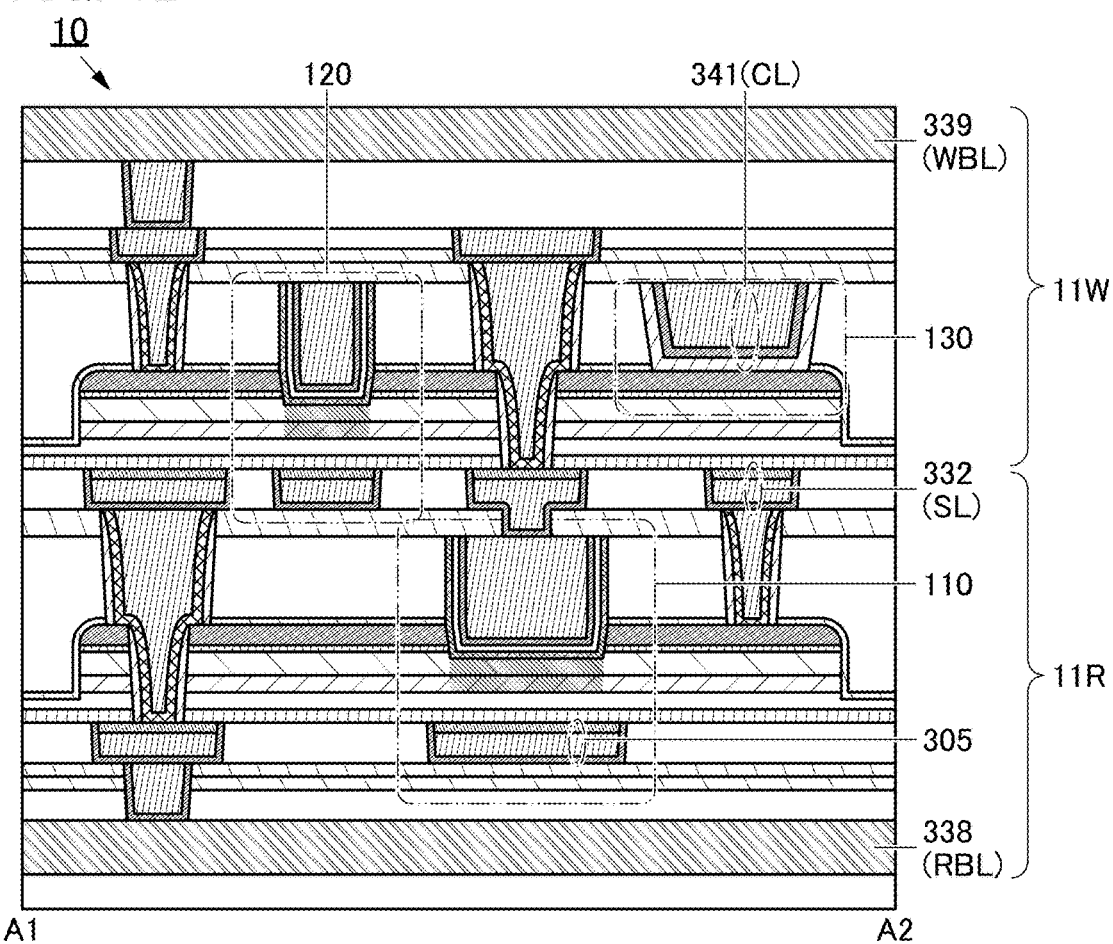
FIG. 1B is a cross-sectional view of the memory cell.
Figure 2:
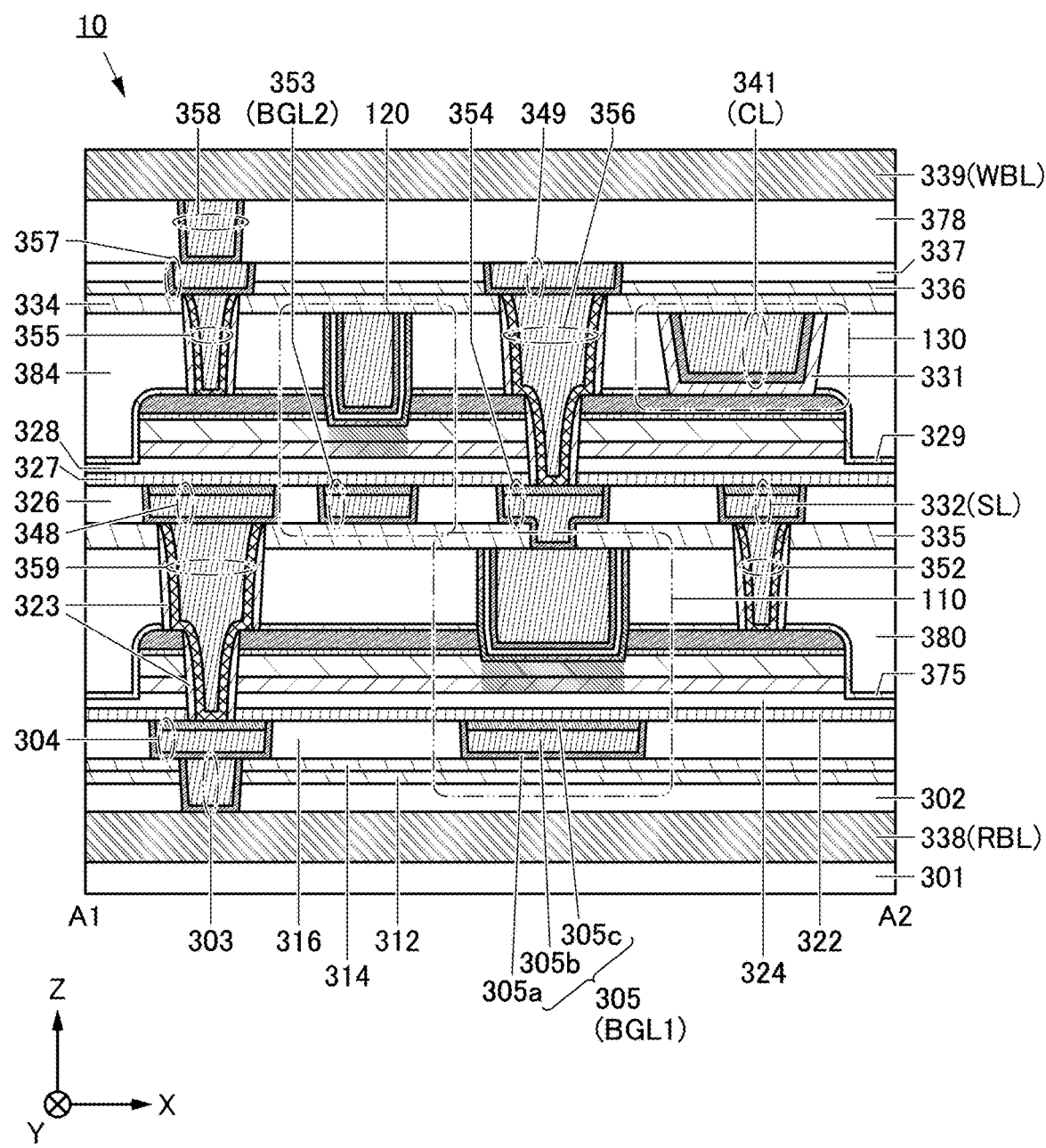
FIG. 2 is a cross-sectional view of a memory cell.
Figure 3A:
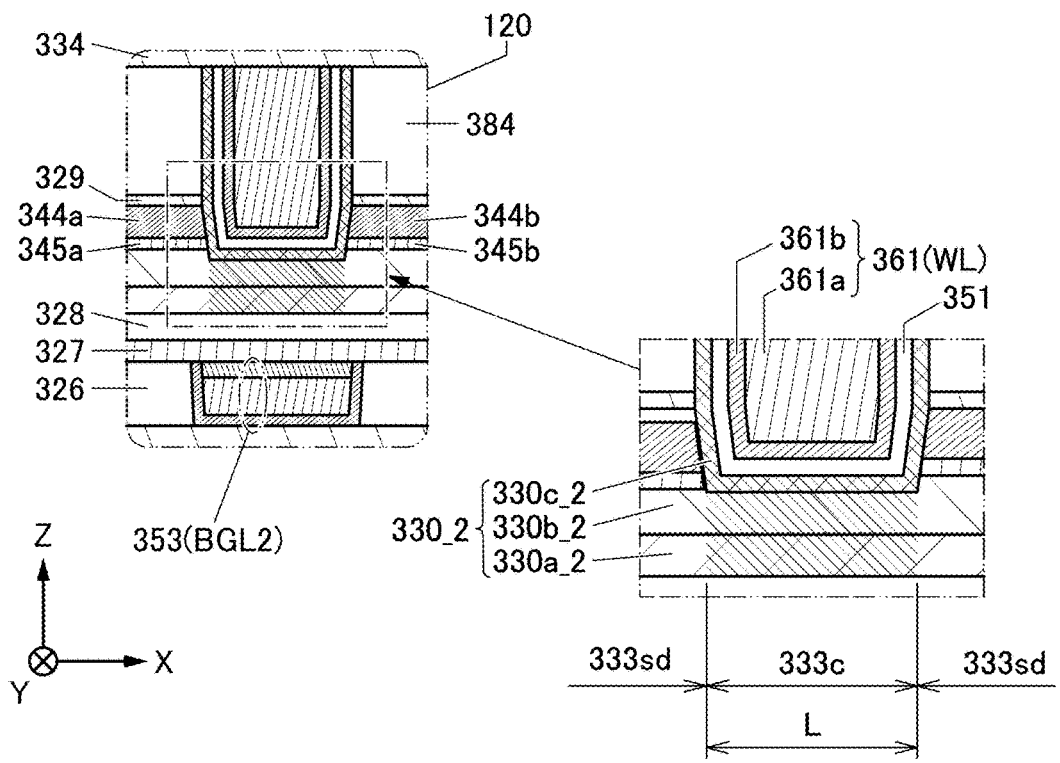
FIG. 3A and FIG. 3B are cross-sectional views of transistors.
Figure 3B:
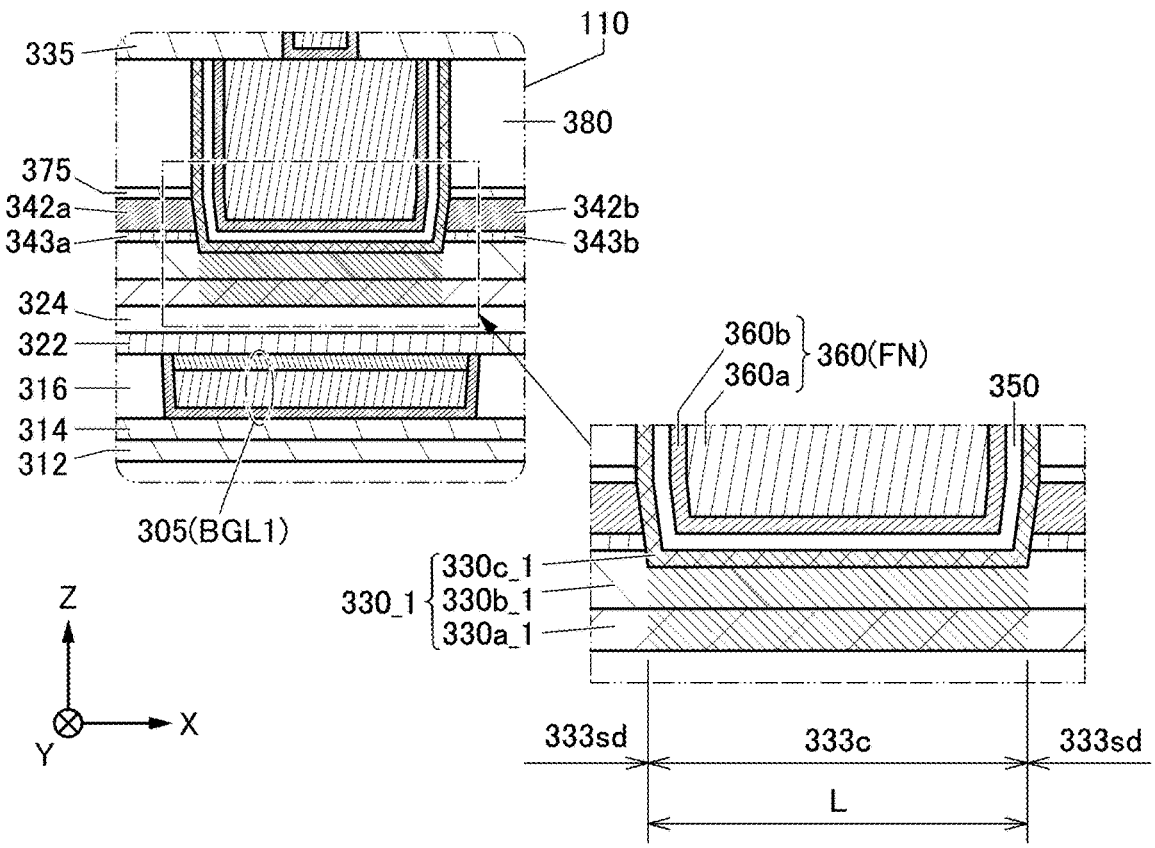

FIG. 1A is a plan view of the memory cell 10. FIG. 1B and FIG. 2 are cross-sectional views taken along a portion A1-A2 indicated by the dashed-dotted line in FIG. 1A. FIG. 3A is an enlarged view of a transistor 120 illustrated in FIG. 1B and FIG. 2. FIG. 3B is an enlarged view of a transistor 110 in FIG. 1B and FIG. 2.

Figure 5A:
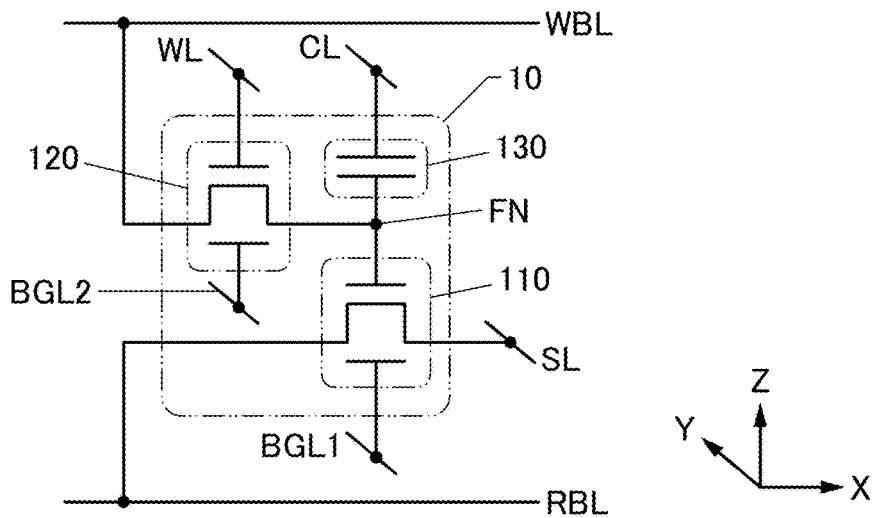
FIG. 5A to FIG. 5C are circuit diagrams of memory cells.
Figure 5B:
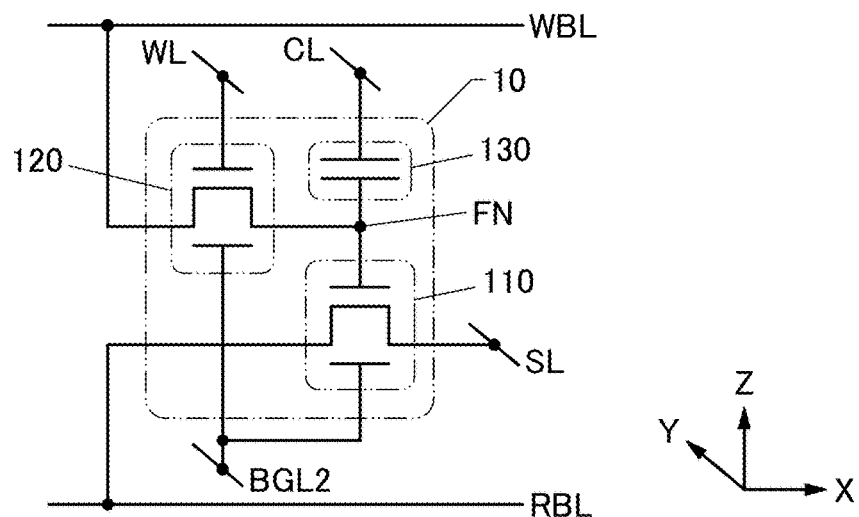
Figure 5C:
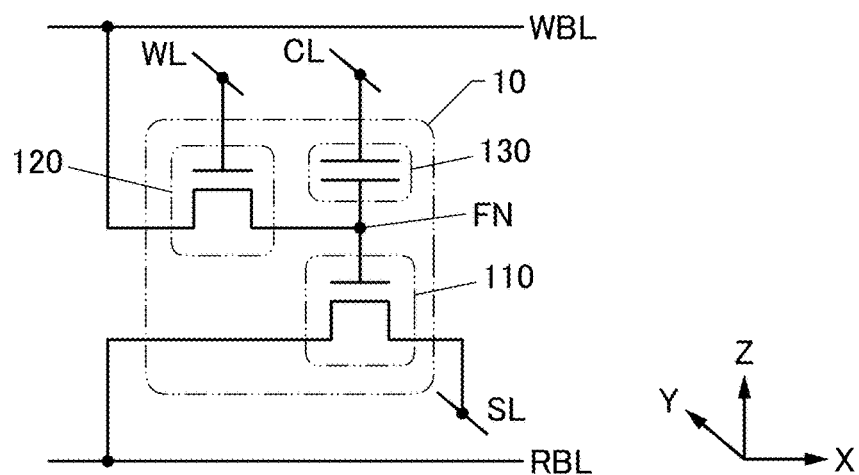

FIG. 4A is a cross-sectional view taken along a portion B1-B2 indicated by the dashed-dotted line in FIG. 1A. FIG. 4B is a cross-sectional view taken along a portion C1-C2 indicated by the dashed-dotted line in FIG. 1A. FIG. 5A to FIG. 5C are circuit diagrams illustrating circuit configuration examples of the memory cell 10.

FIG. 1B, FIG. 2, FIG. 3A, and FIG. 3B show the cross sections of transistors in the channel length direction. FIG. 4A and FIG. 4B show the cross sections of the transistors in the channel width direction. Note that some components are not illustrated in FIG. 1 and the like for easy understanding of description.

Note that arrows indicating the X direction, the Y direction, and the Z direction are illustrated in drawings. The X direction, the Y direction, and the Z direction are directions orthogonal to each other. In this specification and the like, one of the X direction, the Y direction, and the Z direction may be referred to as a first direction. Another one of the other two directions may be referred to as a second direction. Furthermore, the remaining one of the directions may be referred to as a third direction.

<Configuration Example of Memory Cell 10>

First, an example of a circuit configuration of the memory cell 10 will be described. As illustrated in FIG. 5A, the memory cell 10 includes the transistor 110 and the transistor 120. One of a source and a drain of the transistor 110 is electrically connected to a wiring RBL, and the other thereof is electrically connected to a wiring SL. A back gate of the transistor 110 is electrically connected to a wiring BGL1. One of a source and a drain of the transistor 120 is electrically connected to a wiring WBL, and the other thereof is electrically connected to a gate of the transistor 110. A gate of the transistor 120 is electrically connected to a wiring WL, and the back gate thereof is electrically connected to a wiring BGL2.

The memory cell 10 includes a capacitor 130 between the gate of the transistor 110 and a wiring CL. In other words, the memory cell 10 includes the capacitor 130 between the other of the source and the drain of the transistor 120 and the wiring CL. In this specification and the like, a node in which the gate of the transistor 110 is electrically connected to the other of the source and the drain of the transistor 120 is referred to as a node FN. Thus, the memory cell 10 includes the capacitor 130 between the node FN and the wiring CL.

The memory cell 10 has a function of holding a potential (charge) written to the node FN. Specifically, a voltage for turning on the transistor 120 is supplied to the gate of the transistor 120, whereby electrical continuity is established between the wiring WBL and the node FN. Thus, charge for setting the node FN at a predetermined voltage is supplied to the node FN through the wiring WBL. Then, a voltage for turning off the transistor 120 is supplied to the gate of the transistor 120. The charge written to the node FN can be retained when the transistor 120 is turned off.

For semiconductor layers of the transistor 120 and the transistor 110, a single-crystal semiconductor, a polycrystalline semiconductor, a microcrystalline semiconductor, an amorphous semiconductor, or the like can be used alone or in combination. As a semiconductor material, silicon, germanium, or the like can be used, for example. Alternatively, a compound semiconductor such as silicon germanium, silicon carbide, gallium arsenide, an oxide semiconductor, or a nitride semiconductor may be used.

Note that the semiconductor layers used for the transistor may be stacked. In the case of stacking semiconductor layers, semiconductors having different crystal states may be used or different semiconductor materials may be used.

In particular, the transistor 120 is preferably an OS transistor. An oxide semiconductor has a band gap of 2 eV or more and thus enables the off-state current to be extremely small. When an OS transistor is used as the transistor 120, charge written to the node FN can be retained for a long time. The use of an OS transistor as the transistor 120 can make the capacitor 130 small. Alternatively, the capacitor 130 can be omitted. Accordingly, the area occupied by the memory cell 10 can be reduced. In the case where an OS transistor is used as the transistor 120, the memory cell 10 can be referred to as an "OS memory".

The OS memory can retain data written thereto for a year or more, or ten years or more even after power supply is stopped. Hence, the OS memory can be regarded as a nonvolatile memory.

Since the amount of charge written to the OS memory hardly changes for a long period, multilevel (multi-bit) data as well as binary (1-bit) data can be retained in the OS memory.

In addition, charge is written to a node through an OS transistor in the OS memory, which eliminates the need for a high voltage that has been necessary in conventional flash memories and achieves high-speed writing. The OS memory does not require an erasing operation that is performed in flash memories before data rewriting. Furthermore, the OS memory does not conduct charge injection and extraction to and from a floating gate or a charge-trap layer, substantially allowing an unlimited number of times of data writing and reading. The OS memory is less likely to deteriorate and has higher reliability than conventional flash memories.

Unlike a magneto-resistive memory (MRAM), a resistance-change memory (ReRAM), and the like, the OS memory does not undergo a structure change at the atomic level. Hence, the OS memory has higher write endurance than the magneto-resistive memory and the resistance-change memory.

The off-state current of the OS transistor hardly increases even in high-temperature environments, specifically, at higher than or equal to room temperature and lower than or equal to 200° C. In addition, the on-state current of the OS transistor is unlikely to decrease even in high-temperature environments. A memory device including the OS memory achieves a stable operation and high reliability even in high-temperature environments. Furthermore, the withstand voltage between the source and the drain of the OS transistor is high. With the use of the OS transistor, a semiconductor device can operate stably and have high reliability even in high-temperature environments.

Alternatively, as illustrated in FIG. 5B, the back gate of the transistor 120 and the back gate of the transistor 110 may be connected to a common wiring. FIG. 5B illustrates an example in which the back gates of the transistors 120 and 110 are connected to the wiring BGL2.

Alternatively, as illustrated in FIG. 5C, a configuration in which the back gate of the transistor 120 and the back gate of the transistor 110 are not provided may be employed as necessary. Alternatively, a configuration in which one of the back gate of the transistor 120 and the back gate of the transistor 110 is not provided may be employed.

Next, a layered structure example of the memory cell 10 is described. The memory cell 10 of one embodiment of the present invention includes a writing layer 11W and a reading layer 11R (see FIG. 1A, FIG. 1B, and FIG. 2).

The writing layer 11W includes the transistor 120 and the capacitor 130, and the reading layer 11R includes the transistor 110. Thus, in this embodiment and the like, the transistor 120 is provided above the transistor 110. When the transistor 120 and the transistor 110 are provided along the Z direction, the area occupied by the memory cell 10 can be reduced. Furthermore, areal density per unit area can be increased.

In this embodiment and the like, the writing layer 11W is provided over the reading layer 11R; however, one embodiment of the present invention is not limited to this. The reading layer 11R may be provided over the writing layer 11W. Specifically, although the transistor 120 is provided above the transistor 110 in this embodiment, the transistor 110 may be provided above the transistor 120. Note that in the case where the transistor 110 is called a "reading transistor", the transistor 120 is called a "writing transistor" in some cases.

The memory cell 10 illustrated in FIG. 1A, FIG. 1B, and FIG. 2 includes a conductor 338 over the insulator 301, and an insulator 302 over the conductor 338. The conductor 338 functions as the wiring RBL. The memory cell 10 also includes an insulator 312 over the insulator 302, an insulator 314 over the insulator 312, and an insulator 316 over the insulator 314. The memory cell 10 also includes a conductor 303 that is placed to be embedded in the insulator 302, the insulator 312, and the insulator 314. The memory cell 10 also includes a conductor 304 and a conductor 305 (a conductor 305a, a conductor 305b, and a conductor 305c) which are placed to be embedded in the insulator 316. The memory cell 10 also includes an insulator 322 over the insulator 316, the conductor 304, and the conductor 305, an insulator 324 over the insulator 322, an oxide 330a1 over the insulator 324, and an oxide 330b1 over the oxide 330a1.

The memory cell 10 includes an oxide 343a and an oxide 343b over the oxide 330b_1, a conductor 342a over the oxide 343a, and a conductor 342b over the oxide 343b. In this specification and the like, the oxide 343a and the oxide 343b are collectively referred to as an oxide 343 in some cases. The conductor 342a and the conductor 342b are collectively referred to as a conductor 342 in some cases.

Note that one of the conductor 342a and the conductor 342b functions as a source electrode of the transistor 110 and the other functions as a drain electrode thereof.

The memory cell 10 includes an insulator 375 placed to cover the conductor 342 and an insulator 380 over the insulator 375. An opening reaching the oxide 330b_1 is provided in the insulator 380 and the insulator 375. An oxide 330c_1, an insulator 350, and a conductor 360 (a conductor 360a and a conductor 360b) are placed in the opening.

Note that in this specification and the like, the oxide 330a_1, the oxide 330b_1, and the oxide 330c_1 are collectively referred to as an oxide 330_1 in some cases.

The oxide 330c_1 is provided in contact with a top surface of the oxide 330b_1 that overlaps with the opening, a side surface of the oxide 343, a side surface of the conductor 342, a side surface of the insulator 375, and a side surface of the insulator 380. The insulator 350 is provided adjacent to the top surface of the oxide 330b_1 that overlaps with the opening, the side surface of the oxide 343, the side surface of the conductor 342, the side surface of the insulator 375, and the side surface of the insulator 380 with the oxide 330c_1 positioned therebetween. The conductor 360 is preferably provided in contact with the insulator 350. As illustrated in FIG. 2 and FIG. 3B, a top surface of the conductor 360, a top surface of the insulator 350, and a top surface of the oxide 330c_1 are substantially aligned with a top surface of the insulator 380.

The opening is provided between the conductor 342a and the conductor 342b and between the oxide 343a and the oxide 343b. Thus, the conductor 360 is provided between the conductor 342a and the conductor 342b and between the oxide 343a and the oxide 343b.

The memory cell 10 includes an insulator 335 over the insulator 380 and the conductor 360. A contact plug 359 is embedded in the insulator 335, the insulator 380, the insulator 375, the conductor 342a, the oxide 343a, the oxide 330b_1, the oxide 330a_1, the insulator 324, and the insulator 322. An insulator 323 may be provided on a side surface of the contact plug 359. The conductor 342a is electrically connected to the conductor 338 through the contact plug 359, the conductor 304, and the conductor 303.

A contact plug 352 is embedded in the insulator 335, the insulator 380, and the insulator 375. The contact plug 352 is electrically connected to the conductor 342b.

The memory cell 10 includes an insulator 326 over the insulator 335, and a conductor 353 and a conductor 332 are embedded in the insulator 326. The conductor 332 is electrically connected to the conductor 342b through the contact plug 352. The conductor 332 functions as the wiring SL.

A conductor 354 is embedded in the insulator 326 and the insulator 335. The conductor 354 is electrically connected to the conductor 360. A conductor 348 is preferably provided over the contact plug 359. Like the conductor 353, the conductor 348 is embedded in the insulator 326 and the insulator 335. By providing the conductor 348 over the contact plug 359, diffusion of impurities from the above to the contact plug 359 can be suppressed. The conductor 353, the conductor 354, the conductor 332, the conductor 348, and the like preferably have the same structure as that of the conductor 305 described later.

The memory cell 10 includes an insulator 327 over the insulator 326, the conductor 353, the conductor 354, and the conductor 332, and includes an insulator 328 over the insulator 327. The memory cell 10 includes an oxide 330a2 over the insulator 328, and includes an oxide 330b_2 over the oxide 330a_2. The memory cell 10 includes an oxide 345a and an oxide 345b over the oxide 330b_2. The memory cell 10 includes a conductor 344a over the oxide 345a, and includes a conductor 344b over the oxide 345b. In this specification and the like, the oxide 345a and the oxide 345b are collectively referred to as an oxide 345 in some cases. Furthermore, the conductor 344a and the conductor 344b are collectively referred to as a conductor 344 in some cases.

Note that one of the conductor 344a and the conductor 344b functions as a source electrode of the transistor 120, and the other functions as a drain electrode thereof.

The memory cell 10 includes an insulator 329 placed to cover the conductor 344, and includes an insulator 384 over the insulator 329. An opening reaching the oxide 330b_2 is provided in the insulator 329 and the insulator 384. An oxide 330c_2, an insulator 351, and a conductor 361 (a conductor 361a and a conductor 361b) are placed in the opening.

Note that in this specification and the like, the oxide 330a_2, the oxide 330b_2, and the oxide 330c_2 are collectively referred to as an oxide 330_2 in some cases. The oxide 330_1 and the oxide 330_2 are collectively referred to as an oxide 330 in some cases.

The oxide 330a_1 and the oxide 330a_2 are collectively referred to as an oxide 330a in some cases. The oxide 330b_1 and the oxide 330b_2 are collectively referred to as an oxide 330b in some cases. The oxide 330c_1 and the oxide 330c_2 are collectively referred to as an oxide 330c in some cases.

The oxide 330c_2 is provided in contact with a top surface of the oxide 330b_2 that overlaps with the opening, a side surface of the oxide 345, a side surface of the conductor 344, a side surface of the insulator 329, and a side surface of the insulator 384. The insulator 351 is provided adjacent to the top surface of the oxide 330b_2 that overlaps with the opening, the side surface of the oxide 345, the side surface of the conductor 344, the side surface of the insulator 329, and the side surface of the insulator 384 with the oxide 330c_2 positioned therebetween. The conductor 361 is preferably provided in contact with the insulator 351. As illustrated in FIG. 2 and FIG. 3A, a top surface of the conductor 361, a top surface of the insulator 351, and a top surface of the oxide 330c_2 are substantially aligned with a top surface of the insulator 384.

The opening is provided between the conductor 344a and the conductor 344b and between the oxide 345a and the oxide 345b. Thus, the conductor 361 is provided between the conductor 344a and the conductor 344b and between the oxide 345a and the oxide 345b.

An opening reaching the conductor 344b is provided in the insulator 384 and the insulator 329. An insulator 331 and a conductor 341 are placed in the opening. The conductor 341 functions as the wiring CL. The conductor 341 has a region overlapping with the conductor 344b through the insulator 331 positioned therebetween. The region functions as the capacitor 130.

The memory cell 10 includes an insulator 334 over the insulator 384 and the conductor 361. A contact plug 356 is embedded in the insulator 334, the insulator 384, the insulator 329, the conductor 344a, the oxide 345a, the oxide 330b_2, the oxide 330a_2, the insulator 328, and the insulator 327. The conductor 344b is electrically connected to the conductor 360 through the contact plug 356 and the conductor 354.

A contact plug 355 is embedded in the insulator 334, the insulator 384, and the insulator 329. The contact plug 355 is electrically connected to the conductor 344a.

The memory cell 10 includes an insulator 336 over the insulator 334, and includes an insulator 337 over the insulator 336. A conductor 357 is embedded in the insulator 336 and the insulator 337. The conductor 357 is provided over the contact plug 355. A conductor 349 may be provided over the contact plug 356. The conductor 349 is embedded in the insulator 336 and the insulator 337. The conductor 349 and the conductor 357 may have a structure similar to that of the conductor 305 described later.

The memory cell 10 includes an insulator 378 over the insulator 337 and the conductor 357, and a conductor 358 is embedded in the insulator 378. The memory cell 10 also includes a conductor 339 over the conductor 358 and the insulator 378. The conductor 339 is electrically connected to the conductor 344a through the conductor 358, the conductor 357, and the contact plug 355. The conductor 339 functions as the wiring WBL.

Note that an insulator similar to the insulator 323 may be provided on surfaces of the contact plug 352, the contact plug 355, and the contact plug 356.

The conductor 361 functions as a gate electrode of the transistor 120 and also functions as the wiring WL. The conductor 360 functions as a gate electrode of the transistor 110 and also functions as the node FN.

The insulator 350 and the insulator 351 function as a gate insulator (also referred to as a "first gate insulator"). The insulator 324, the insulator 322, the insulator 328, and the insulator 327 function as a back gate insulator (also referred to as a "second gate insulator").

The conductor 353 functions as a back gate electrode of the transistor 120 and also functions as the wiring BGL2. The conductor 305 functions as a back gate electrode of the transistor 110 and also functions as the wiring BGL1.

Note that in FIG. 1B and FIG. 2, the conductor 353 serving as a back gate electrode of the transistor 120 is provided on the reading layer 11R side. Thus, it can be said that part of the transistor 120 provided in the writing layer 11W is provided on the reading layer 11R side.

At least part of a region of the oxide 330_1 which overlaps with the conductor 360 functions as a channel formation region. Similarly, at least part of a region of the oxide 330_2 which overlaps with the conductor 361 functions as a channel formation region.

For example, each of the oxide 330_1 and the oxide 330_2 includes a region 333c functioning as a channel formation region of a transistor and a region 333sd functioning as a source region or a drain region (see FIG. 3A and FIG. 3B). In the transistor 110, at least part of the region 333c overlaps with the conductor 360. In other words, the region 333c is provided in a region between the conductor 342a and the conductor 342b. The region 333sd overlaps with the conductor 342. Note that the oxide 330_2 included in the transistor 120 is the same as the oxide 330_1 included in the transistor 110.

Note that the oxide 330_1 and the oxide 330_2 may have the same composition or different compositions.

The region 333c functioning as the channel formation region has a smaller amount of oxygen vacancies or a lower impurity concentration than the region 333sd, i.e., is a high-resistance region with a low carrier concentration. The region 333sd functioning as the source or the drain region has a large amount of oxygen vacancies or a high concentration of impurities such as hydrogen, nitrogen, and a metal element, i.e., is a low-resistance region with a high carrier concentration. That is, the region 333sd has a higher carrier concentration and a lower resistance than the region 333c.

The carrier concentration in the region 333c functioning as the channel formation region is preferably lower than or equal to $1 \times 10^{18}$ cm$^{-3}$, further preferably lower than $1 \times 10^{17}$ cm$^{-3}$, still further preferably lower than $1 \times 10^{16}$ cm$^{-3}$, yet further preferably lower than $1 \times 10^{13}$ cm$^3$, and yet still further preferably lower than $1 \times 10^{12}$ cm$^3$. Note that the lower limit of the carrier concentration in the region 333c functioning as the channel formation region is not particularly limited and can be, for example, $1 \times 10^{-9}$ cm$^3$.

A region having a carrier concentration lower than or equal to that of the region 333sd and higher than or equal to that of the region 333c may be formed between the region 333c and the region 333sd. That is, the region functions as a junction region between the region 333c and the region 333sd. The hydrogen concentration in the junction region is sometimes lower than or equal to that in the region 333sd and higher than or equal to that in the region 333c. The amount of oxygen vacancies in the junction region is sometimes smaller than or equal to that in the region 333sd and larger than or equal to that in the region 333c.

In the oxide 330, the boundaries between the regions are difficult to clearly observe in some cases. The concentration of a metal element and an impurity element such as hydrogen or nitrogen, which is detected in each region, may be gradually changed not only between the regions but also in each region. That is, the region closer to the channel formation region preferably has a lower concentration of a metal element and an impurity element such as hydrogen or nitrogen.

A metal oxide functioning as a semiconductor (hereinafter, such a metal oxide is also referred to as an oxide semiconductor) is preferably used for the oxide 330 including the channel formation region. The metal oxide functioning as a semiconductor preferably has a band gap of 2 eV or more, preferably 2.5 eV or more. The use of such a metal oxide having a wide band gap can reduce the off-state current of the transistor.

A reduction in the off-state current of the transistor 110 can significantly reduce the leakage current between the wiring RBL and the wiring SL. This enables the power consumption of the memory cell 10 to be reduced considerably. In addition, a reduction in the off-state current of the transistor 120 allows data to be retained in the memory cell 10 for an extremely long time.

For example, as the oxide 330, a metal oxide such as an In-M-Zn oxide containing indium, an element M, and zinc is used; the element M is one or more selected from aluminum, gallium, yttrium, tin, copper, vanadium, beryllium, boron, titanium, iron, nickel, germanium, zirconium, molybdenum, lanthanum, cerium, neodymium, hafnium, tantalum, tungsten, magnesium, and the like. For example, an In—Ga—Zn oxide may be used as the oxide 330, and an oxide obtained by adding tin to an In—Ga—Zn oxide (In—Ga—Zn—Sn oxide) may be used. Alternatively, an In—Ga oxide, an In—Zn oxide, or indium oxide may be used as the oxide 330.

The metal oxide can be deposited on a substrate by a sputtering method or the like. Hence, a memory cell array can be provided over a peripheral circuit such as a driver circuit formed on a silicon substrate. This reduces the area occupied by the peripheral circuit in one chip and increases the area occupied by the memory cell array, resulting in an increase in the storage capacity of a semiconductor device. Furthermore, when a plurality of metal oxide films are stacked, a stack of memory cell arrays can be obtained. As a result, the integration of cells is achieved without an increase in the area occupied by the memory cell array, that is, a 3D cell array can be configured. A high integration of memory cells is thus possible and a semiconductor device with large storage capacity can be provided.

If impurities and oxygen vacancies exist in a channel formation region of an oxide semiconductor, a transistor including the oxide semiconductor might have variable electrical characteristics and poor reliability. In addition, hydrogen in the vicinity of the oxygen vacancies enters the oxygen vacancies to form a defect (hereinafter, also referred to as VoH), so that an electron serving as a carrier might be generated even when no voltage is applied to a gate electrode of the transistor. Therefore, when the channel formation region in the oxide semiconductor includes oxygen vacancies, the transistor tends to have normally-on characteristics (the channel is generated even when no voltage is applied to the gate electrode and current flows through the transistor). Thus, impurities, oxygen vacancies, and VoH are preferably reduced as much as possible in the channel formation region in the oxide semiconductor. In other words, when no voltage is applied to the gate electrode of the transistor, the channel formation region in the oxide semiconductor preferably has a reduced carrier concentration to be an i-type (intrinsic) or substantially i-type region.

In contrast, when an insulator containing oxygen that is released by heating (hereinafter, also referred to as excess oxygen) is provided in the vicinity of the oxide semiconductor and heat treatment is performed, oxygen can be supplied from the insulator to the oxide semiconductor so as to reduce oxygen vacancies and VoH. Note that too much oxygen supplied to the source region or the drain region might decrease the on-state current or the field-effect mobility of the transistor. Furthermore, a variation in the amount of oxygen supplied to the source region or the drain region on the substrate plane leads to variable characteristics of the semiconductor device including the transistor.

Hence, the region 333c functioning as the channel formation region in the oxide semiconductor is preferably an i-type or substantially i-type region with a low carrier concentration, whereas the region 333sd functioning as the source or the drain region is preferably an n-type region with a high carrier concentration. That is, it is preferable that in the oxide semiconductor, oxygen vacancies and VoH in the region 333c be reduced and supply of too much oxygen to the region 333sd be prevented.

For example, in the fabrication of the transistor 110, an opening overlapping with the oxide 330b_1 is formed in part of the insulator 380 and the insulator 375, and microwave treatment is performed in an oxygen-containing atmosphere in the state where the oxide 330c_1 and the insulator 350 are formed in the opening, thereby reducing oxygen vacancies and VoH in the region 333c. In this case, oxygen vacancies and VoH in the oxide 330c_1 are also reduced. Here, the microwave treatment refers to, for example, treatment using an apparatus including a power source that generates high-density plasma with the use of a microwave. Note that the microwave treatment may be performed before the insulator 350 is formed.

The microwave treatment in an oxygen-containing atmosphere converts oxygen gas into plasma using a microwave or a high-frequency wave such as RF and activates the oxygen plasma. At this time, the region 333c can be irradiated with the microwave or the high-frequency wave such as RF. The effect of the plasma, the microwave, and the like enables VoH in the region 333c to be cut off, hydrogen H to be removed from the region 333c, and oxygen vacancies Vo to be compensated with oxygen. That is, the reaction "VoH→H+Vo" occurs in the region 333c, so that the hydrogen concentration in the region 333c can be reduced. As a result, oxygen vacancies and VoH in the region 333c can be reduced to lower the carrier concentration.

In the microwave treatment in an oxygen-containing atmosphere, the effect of the microwave, the high-frequency wave such as RF, the oxygen plasma, and the like is blocked by the conductor 342a and the conductor 342b and does not reach the region 333sd. Furthermore, the effect of the oxygen plasma can be reduced by the insulator 375 and the insulator 380. Thus, the region 333sd does not undergo a reduction in VoH and not receive excessive oxygen in the microwave treatment, so that a decrease in the carrier concentration in the region 333sd can be prevented.

In the above manner, oxygen vacancies and VoH can be selectively removed from the region 333c in the oxide semiconductor, whereby the region 333c can be an i-type or substantially i-type region. Furthermore, supply of too much oxygen to the region 333sd functioning as the source or the drain region can be inhibited and the n-type region can be maintained. Accordingly, a variation in the electrical characteristics of the transistor 110 can be reduced to inhibit variations in the electrical characteristics of the transistor 110 on the substrate plane.

The microwave treatment can be performed when the transistor 120 as well as the transistor 110 is formed.

With the transistor 120 and the transistor 110 having the above structures, the semiconductor device with a small variation in transistor characteristics can be provided. In addition, a semiconductor device having favorable electrical characteristics can be provided. A highly reliable semiconductor device can also be provided.

The length of the region 333c in the X direction is a channel length L (see FIG. 3A and FIG. 3B). For example, the channel length L of the transistor 110 is the shortest distance from an end portion of the conductor 342a to an end portion of the conductor 342b in a region overlapping with the oxide 330_1 when seen from the Z direction. The channel length L of the transistor 120 is the shortest distance from an end portion of the conductor 344a to an end portion of the conductor 344b in a region overlapping with the oxide 330_2 when seen from the Z direction.

The length of the region 333c in the Y direction is a channel width W (see FIG. 4A and FIG. 4B). For example, the channel width W of the transistor 110 is the shortest distance from an end portion to the other end portion of the oxide 330b_1 in the region 333c in the Y direction when seen from the Z direction. For example, the channel width W of the transistor 120 is the shortest distance from an end portion to the other end portion of the oxide 330b_2 in the region 333c when seen from the Z direction.

As described above, a high voltage needed for a conventional flash memory is not necessary for the memory cell 10 of one embodiment of the present invention. Thus, the channel length L of the transistor can be shortened. Consequently, the operating speed of the memory cell 10 can be increased. Furthermore, the area occupied by the memory cell 10 can be reduced.

The channel length L of the transistor 110 may be the same as or different from the channel length L of the transistor 120. A reduction in the channel length L of the transistor 110 can increase the reading speed of the memory cell 10. A reduction in the channel length L of the transistor 120 can increase the writing speed of the memory cell 10.

The channel width W of the transistor 110 may be the same as or different from the channel width W of the transistor 120. An increase in the channel width W of the transistor 110 can increase the reading speed of the memory cell 10. An increase in the channel width W of the transistor 120 can increase the writing speed of the memory cell 10.

An increase in the channel length L can reduce Vth variations of transistors. Thus, the channel length L of the transistor 110 functioning as a reading transistor is preferably long. In particular, in the case where multilevel data is stored in the memory cell 10, the channel length L of the transistor 110 is preferably long.

When the channel length L of the transistor 120 functioning as a writing transistor is made short and the channel length L of the transistor 110 functioning as a reading transistor is made long, a memory cell with a high writing speed and a high reading speed can be achieved.

Note that a side surface of an opening which is filled with the conductor 360 or the like and/or a side surface of an opening which is filled with the conductor 361 or the like may be substantially perpendicular to a formation surface of the oxide 330b including a groove portion of the oxide 330b. However, this embodiment is not limited to this. For example, the bottom portion of the opening may have a U-shape with a moderate curve. For example, the side surface of the opening may be tilted with respect to the formation surface of the oxide 330b.

As illustrated in FIG. 4A, a curved surface may be provided between the side and top surfaces of the oxide 330b1 in a cross-sectional view in the channel width direction of the transistor 110. In other words, the end portion of the side surface and the end portion of the top surface may be curved (hereinafter referred to as rounded). Similarly, as illustrated in FIG. 4B, a curved surface may be provided between the side and top surfaces of the oxide 330b_2 in a cross-sectional view in the channel width direction of the transistor 120.

The radius of curvature of the curved surface is preferably greater than 0 nm and less than the thickness of the oxide 330b_1 (or the oxide 330b_2) in a region overlapping with the conductor 342 (or the conductor 344), or less than half of the length of a region that does not have the curved surface. Specifically, the radius of curvature of the curved surface is greater than 0 nm and less than or equal to 20 nm, preferably greater than or equal to 1 nm and less than or equal to 15 nm, and further preferably greater than or equal to 2 nm and less than or equal to 10 nm. Such a shape can improve the coverage of the oxide 330b_1 (or the oxide 330b_2) with the insulator 350 (or the insulator 351) and the conductor 360 (or the conductor 361).

The oxide 330 preferably has a stacked-layer structure of oxide layers with different chemical compositions. Specifically, the atomic ratio of the element M to a metal element that is the main component in the metal oxide used as the oxide 330a and the oxide 330c is preferably higher than that in the metal oxide used as the oxide 330b. Moreover, the atomic ratio of the element M to In in the metal oxide used as the oxide 330a and the oxide 330c is preferably greater than that in the metal oxide used as the oxide 330b. Moreover, the atomic ratio of In to the element M in the metal oxide used as the oxide 330b is preferably greater than that in the metal oxide used as the oxide 330a and the oxide 330c.

The oxide 330c may have composition similar to that of the oxide 330b. The oxide 330c may have a stacked structure in which an oxide having composition similar to that of the oxide 330a is stacked over an oxide having composition similar to that of the oxide 330b.

Under such conditions, the oxide 330a is placed under the oxide 330b, whereby impurities and oxygen can be inhibited from diffusing into the oxide 330b from components formed below the oxide 330a. Similarly, the oxide 330c is placed over the oxide 330b, whereby impurities and oxygen can be inhibited from diffusing into the oxide 330b from the components formed above the oxide 330c.

The oxide 330b is preferably an oxide having crystallinity, such as a CAAC-OS. An oxide having crystallinity, such as a CAAC-OS, has a dense structure with small amounts of impurities and defects (e.g., oxygen vacancies) and high crystallinity. Accordingly, extraction of oxygen from the oxide 330b by the source electrode or the drain electrode can be suppressed. This inhibits extraction of oxygen from the oxide 330b even when heat treatment is performed; hence, the OS transistor is stable under high temperatures in the manufacturing process (i.e., thermal budget).

In particular, heat treatment is performed at a temperature at which the metal oxide does not become a polycrystal (e.g., 400° C. to 600° C.), whereby a CAAC-OS having a dense structure with higher crystallinity can be obtained. When the density of the CAAC-OS is increased in such a manner, diffusion of impurities or oxygen in the CAAC-OS can be further reduced.

On the other hand, a clear crystal grain boundary is difficult to observe in the CAAC-OS; thus, it can be said that a reduction in electron mobility due to the crystal grain boundary is less likely to occur. Thus, a metal oxide including a CAAC-OS is physically stable. Therefore, the metal oxide including a CAAC-OS is resistant to heat and has high reliability.

Here, the conduction band minimum is gradually varied at a junction portion of the oxide 330a and the oxide 330b and at a junction portion of the oxide 330c and the oxide 330b. In other words, the conduction band minimum at the junction portion of the oxide 330a and the oxide 330b and the conduction band minimum at the junction portion of the oxide 330c and the oxide 330b are continuously varied or continuously connected. To achieve this, the density of defect states in a mixed layer formed at the interface between the oxide 330a and the oxide 330b and at the interface between the oxide 330c and the oxide 330b is preferably decreased.

Specifically, when the oxide 330a, the oxide 330b, and the oxide 330c contain the same element as a main component in addition to oxygen, a mixed layer with a low density of defect states can be formed. For example, in the case where the oxide 330b is an In-M-Zn oxide, an In-M-Zn oxide, a M-Zn oxide, an oxide of the element M, an In—Zn oxide, or indium oxide may be used as the oxide 330a and the oxide 330c.

For example, as the oxide 330a and the oxide 330c, a metal oxide having an atomic ratio of In:M:Zn=1:3:4 or in the vicinity thereof, or In:M:Zn=1:1:0.5 or in the vicinity thereof may be used. As the oxide 330b, a metal oxide having an atomic ratio of In:M:Zn=1:1:1 or in the vicinity thereof, or In:M:Zn=4:2:3 or in the vicinity thereof may be used. Note that the vicinity of the atomic ratio includes ±30% of an intended atomic ratio. Gallium is preferably used as the element M.

When the metal oxide is deposited by a sputtering method, the aforementioned atomic ratio is not limited to the atomic ratio of the deposited metal oxide and may be the atomic ratio of a sputtering target used for depositing the metal oxide.

The density of defect states at the interface between the oxide 330a and the oxide 330b can be made low when the oxide 330a, the oxide 330b, and the oxide 330c have the aforementioned composition. Furthermore, the density of defect states at the interface between the oxide 330c and the oxide 330b can be made low. Thus, the influence of interface scattering on carrier conduction can be small and the OS transistor can have a high field-effect mobility, a high on-state current, and high frequency characteristics. The use of such a transistor as the transistor 120 can increase the writing speed. The use of such a transistor as the transistor 110 can increase the reading speed.

At least one of the insulator 312, the insulator 314, the insulator 334, and the insulator 336 preferably functions as a barrier insulating layer that inhibits impurities such as water and hydrogen from diffusing from the substrate side or the above of the transistor 120 into the transistor 120, the transistor 110, or the like. The insulator 323 preferably functions as a barrier insulating layer that inhibits impurities such as hydrogen from diffusing from a side surface side of the contact plug 359 into the contact plug 359.

Therefore, at least one of the insulator 312, the insulator 314, the insulator 334, the insulator 336, and the insulator 323 is preferably formed using an insulating material having a function of inhibiting diffusion of impurities such as a hydrogen atom, a hydrogen molecule, a water molecule, a nitrogen atom, a nitrogen molecule, a nitrogen oxide molecule (e.g., $N_2O$, $NO$, and $NO_2$), and a copper atom. Alternatively, it is preferable to use an insulating material having a function of inhibiting diffusion of oxygen (e.g., at least one of oxygen atoms, oxygen molecules, and the like), that is, an insulating material through which the above oxygen is less likely to pass. An insulating material having a function of inhibiting diffusion of impurities may be used for the insulator 375 and/or the insulator 329. An insulating material having a function of inhibiting diffusion of oxygen may be used for the insulator 375 and/or the insulator 329.

Note that in this specification, a barrier insulating film refers to an insulating film having a barrier property. In this specification, a barrier property means a function of inhibiting diffusion of a particular substance (or low permeability) or a function of capturing or fixing (also referred to as gettering) a particular substance.

Aluminum oxide, hafnium oxide, gallium oxide, indium gallium zinc oxide, silicon nitride, silicon nitride oxide, or the like can be used for the insulator 312, the insulator 314, the insulator 334, the insulator 336, the insulator 375, and the insulator 329. For example, silicon nitride, which has a high hydrogen barrier property, is preferably used for the insulator 312 and the insulator 336. For example, aluminum oxide, which has a function of capturing or fixing more hydrogen, is preferably used for the insulator 314, the insulator 375, the insulator 329, and the insulator 334. Accordingly, impurities such as water and hydrogen can be inhibited from diffusing to the transistor 120 side and the transistor 110 side from the insulator 301 side through the insulator 312 and the insulator 314. Furthermore, impurities such as water and hydrogen can be inhibited from diffusing to the transistor 120 side and the transistor 110 side from an insulator and the like positioned outside the insulator 378. In addition, oxygen contained in the insulator 316 and the like can be inhibited from diffusing to the substrate side through the insulator 312 and the insulator 314. Furthermore, oxygen contained in the insulator 380, the insulator 384, and the like can be inhibited from diffusing over the transistor 120 through the insulator 378 and the like. In this manner, the transistor 120, the transistor 110, and the like are preferably surrounded by the insulator 312, the insulator 314, the insulator 334, and the insulator 336 having a function of inhibiting diffusion of oxygen and impurities such as water and hydrogen.

The insulator 312, the insulator 314, the insulator 334, the insulator 336, the insulator 375, and the insulator 329 can be deposited by a sputtering method, for example. Since the sputtering method does not need to use hydrogen as a deposition gas, the hydrogen concentration in the insulator 312, the insulator 314, the insulator 334, the insulator 336, the insulator 375, and the insulator 329 can be reduced. Note that the deposition method is not limited to the sputtering method, and a chemical vapor deposition (CVD) method, a molecular beam epitaxy (MBE) method, a pulsed laser deposition (PLD) method, an atomic layer deposition (ALD) method, or the like can be used as appropriate.

The resistivity of the insulators 312 and 336 is preferably low in some cases. For example, the insulator 312 and the insulator 336 with a resistivity of approximately $1\times10^{13}$ $\Omega$cm can sometimes relieve charge buildup of the conductor 305, the conductor 342, the conductor 360, the conductor 344, or the conductor 361 in the treatment using plasma or the like in the manufacturing process of a semiconductor device. The resistivity of the insulators 312 and 336 is preferably higher than or equal to $1\times10^{10}$ Ωcm and lower than or equal to $1\times10^{15}$ Ωcm.

The insulator 316, the insulator 380, the insulator 326, and the insulator 384 preferably have a lower dielectric constant than the insulator 314. The use of a material having a low dielectric constant for the interlayer film can reduce the parasitic capacitance between wirings. For example, for the insulators 316, the insulator 380, the insulator 326, and the insulator 384, silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, or the like is used as appropriate. Silicon oxide, silicon oxynitride, and porous silicon oxide are particularly preferable because a region containing oxygen that is released by heating can be easily formed in these materials.

Note that in this specification and the like, "oxynitride" refers to a material that contains more oxygen than nitrogen. For example, "silicon oxynitride" refers to a silicon material that contains more oxygen than nitrogen. Moreover, in this specification and the like, "nitride oxide" refers to a material that contains more nitrogen than oxygen, and "aluminum nitride oxide" refers to an aluminum material that contains more nitrogen than oxygen.

The conductor 305 includes the conductor 305a, the conductor 305b, and the conductor 305c. The conductor 305a is provided in contact with a bottom surface and a side wall of the opening. The conductor 305b is provided so as to be embedded in a recessed portion formed in the conductor 305a. Here, the level of a top surface of the conductor 305b is lower than the levels of top surfaces of the conductor 305a and the insulator 316. The conductor 305c is provided in contact with the top surface of the conductor 305b and a side surface of the conductor 305a. Here, a top surface of the conductor 305c is substantially level with the top surfaces of the conductor 305a and the insulator 316. That is, the conductor 305b is surrounded by the conductor 305a and the conductor 305c.

The conductors 305a and 305c are preferably formed using a conductive material having a function of inhibiting diffusion of impurities such as a hydrogen atom, a hydrogen molecule, a water molecule, a nitrogen atom, a nitrogen molecule, a nitrogen oxide molecule (e.g., $N_2O$, NO, or $NO_2$), and a copper atom. Alternatively, the conductors 305a and 305c are preferably formed using a conductive material having a function of inhibiting diffusion of oxygen (e.g., at least one of oxygen atoms and oxygen molecules).

When the conductors 305a and 305c are formed using a conductive material having a function of inhibiting diffusion of hydrogen, impurities such as hydrogen contained in the conductor 305b can be prevented from diffusing into the oxide 330 through the insulator 324 and the like. When the conductors 305a and 305c are formed using a conductive material having a function of inhibiting diffusion of oxygen, the conductivity of the conductor 305b can be inhibited from being lowered because of oxidation. As the conductive material having a function of inhibiting diffusion of oxygen, for example, titanium, titanium nitride, tantalum, tantalum nitride, ruthenium, or ruthenium oxide is preferably used. Thus, the conductor 305a may be a single layer or a stacked layer of the above conductive materials. For example, titanium nitride may be used for the conductor 305a.

Furthermore, the conductor 305b is preferably formed using a conductive material containing tungsten, copper, or aluminum as its main component. For example, tungsten may be used for the conductor 305b.

The conductor 305 functions as a back gate electrode in some cases. In that case, by changing a potential applied to the conductor 305 independently of a potential applied to the conductor 360, the Vth of the transistor 110 can be controlled. When a negative potential is applied to the conductor 305, Vth of the transistor 110 can be increased and the off-state current can be reduced. Thus, a drain current when a potential applied to the conductor 360 is 0 V can be smaller in the case where a negative potential is applied to the conductor 305 than in the case where the negative potential is not applied to the conductor 305.

The electric resistivity of the conductor 305 is designed in consideration of the potential supplied to the conductor 305, and the thickness of the conductor 305 is determined in accordance with the electric resistivity. The thickness of the insulator 316 is substantially equal to that of the conductor 305. The conductor 305 and the insulator 316 are preferably as thin as possible in the allowable range of the design of the conductor 305. The insulator 316 with a reduced thickness contains a smaller absolute amount of impurity such as hydrogen, inhibiting the diffusion of the impurity into the oxide 330.

Note that the conductor 305 is preferably provided larger than a region in the oxide 330 which does not overlap with the conductor 342a or the conductor 342b when seen in the channel length direction of the transistor 110 (see FIG. 3B). As illustrated in FIG. 4A, the conductor 305 preferably extends beyond end portions of the oxide 330a_1 and the oxide 330b_1 that intersect with the channel width direction. That is, the conductor 305 and the conductor 360 preferably overlap with each other with the insulator positioned therebetween, in a region beyond the side surfaces of the oxide 330a1 and the oxide 330b1 in the channel width direction. With this structure, the channel formation region in the oxide 330 can be electrically surrounded by electric fields of the conductor 360 functioning as the gate electrode (also referred to as the "first gate electrode") and electric fields of the conductor 305 functioning as the back gate electrode (also referred to as the "second gate electrode"). In this specification, a transistor structure in which the channel formation region is electrically surrounded by the electric fields of the first gate electrode and the second gate electrode is referred to as a surrounded channel (S-channel) structure.

In this specification and the like, the S-channel structure refers to a transistor structure in which a channel formation region is electrically surrounded by the electric fields of a pair of gate electrodes. The S-channel structure disclosed in this specification and the like is different from a Fin-type structure and a planar structure. With the S-channel structure, resistance to a short-channel effect can be enhanced, that is, a transistor in which a short-channel effect is less likely to occur can be provided.

The conductor 305 is extended in the channel width direction to have a function of a wiring. However, without limitation to this structure, a conductor functioning as a wiring may be provided under the conductor 305.

Although the conductor 305 in the transistor 110 has a stacked structure of the conductor 305a, the conductor 305b, and the conductor 305c, the present invention is not limited to this structure. For example, the conductor 305 may have a single-layer structure, a two-layer structure, or a stacked-layer structure of four or more layers.

Note that the conductor 305, the insulator 316, the conductor 342, the conductor 360, the transistor 110, and the like in the above description can be replaced with the conductor 353, the insulator 326, the conductor 344, the conductor 361, the transistor 120, and the like.

The insulator 322 and the insulator 327 preferably have a function of inhibiting diffusion of hydrogen (e.g., at least one of hydrogen atoms, hydrogen molecules, and the like). The insulator 322 and the insulator 327 also preferably have a function of inhibiting diffusion of oxygen (e.g., at least one of oxygen atoms and oxygen molecules). For example, the insulator 322 and the insulator 327 preferably have a function of inhibiting diffusion of much hydrogen and/or oxygen compared to the insulator 324 and the insulator 328.

As the insulator 322, an insulator containing an oxide of aluminum and/or hafnium, which is an insulating material, is preferably used. As the insulator, aluminum oxide, hafnium oxide, an oxide containing aluminum and hafnium (hafnium aluminate), or the like is preferably used. The insulator 322 formed of such a material functions as a layer that inhibits release of oxygen from the oxide 330 to the substrate side and diffusion of impurities such as hydrogen from the periphery of the transistor 110 into the oxide 330. Thus, providing the insulator 322 can inhibit diffusion of impurities such as hydrogen into the transistor 110 and inhibit generation of oxygen vacancies in the oxide 330. Moreover, the conductor 305 can be prevented from reacting with oxygen in the insulator 324 or the oxide 330.

Alternatively, aluminum oxide, bismuth oxide, germanium oxide, niobium oxide, silicon oxide, titanium oxide, tungsten oxide, yttrium oxide, or zirconium oxide may be added to the above insulator, for example. Alternatively, the insulator may be subjected to nitriding treatment. The insulator 322 may have a stacked-layer structure including silicon oxide, silicon oxynitride, or silicon nitride over any of these insulators.

The insulator 322 may have a single-layer structure or a stacked-layer structure using an insulator containing a high-k material, such as aluminum oxide, hafnium oxide, tantalum oxide, zirconium oxide, lead zirconate titanate (PZT), strontium titanate ($SrTiO_3$), or $(Ba,Sr)TiO_3$ (BST). As miniaturization and high integration of transistors progress, a problem such as leakage current may arise because of a thinner gate insulator. When a high-k material is used for an insulator functioning as the gate insulator, a gate potential at the time when the transistor operates can be reduced while the physical thickness of the gate insulator is maintained.

The insulator 324 in contact with the oxide 330_1 preferably contains excess oxygen (releases oxygen by heating). For example, silicon oxide or silicon oxynitride can be used as appropriate for the insulator 324. When such an insulator containing oxygen is provided in contact with the oxide 330_1, oxygen vacancies in the oxide 330_1 can be reduced, leading to an improvement in the reliability of the transistor.

Specifically, an oxide material that releases part of oxygen by heating, namely, an insulator material including an excess oxygen region, is preferably used for the insulator 324. An oxide film that releases oxygen by heating is an oxide film in which the amount of released oxygen molecules is greater than or equal to $1.0 \times 10^{18}$ molecules/cm$^3$, preferably greater than or equal to $1.0 \times 10^{19}$ molecules/cm$^3$, further preferably greater than or equal to $2.0 \times 10^{19}$ molecules/cm$^3$ or greater than or equal to $3.0 \times 10^{20}$ molecules/cm$^3$ in thermal desorption spectroscopy (TDS) analysis. Note that the temperature of the film surface in the TDS analysis is preferably higher than or equal to 100° C. and lower than or equal to 700° C., or higher than or equal to 100° C. and lower than or equal to 400° C.

In a manufacturing process of the transistor, the heat treatment is preferably performed with the surface of the oxide 330 exposed. For example, the heat treatment is performed at a temperature higher than or equal to 100° C. and lower than or equal to 600° C., preferably higher than or equal to 350° C. and lower than or equal to 550° C. The heat treatment is performed in a nitrogen gas atmosphere, an inert gas atmosphere, or an atmosphere containing an oxidizing gas at 10 ppm or more, 1% or more, or 10% or more. For example, the heat treatment is preferably performed in an oxygen atmosphere. Accordingly, oxygen can be supplied to the oxide 330 to reduce oxygen vacancies (Vo). The heat treatment may be performed under a reduced pressure. Alternatively, the heat treatment may be performed in such a manner that heat treatment is performed in a nitrogen gas atmosphere or an inert gas atmosphere, and then another heat treatment is performed in an atmosphere containing an oxidizing gas at 10 ppm or more, 1% or more, or 10% or more in order to compensate for released oxygen. Alternatively, the heat treatment may be performed in such a manner that heat treatment is performed in an atmosphere containing an oxidizing gas at 10 ppm or more, 1% or more, or 10% or more, and then another heat treatment is successively performed in a nitrogen gas atmosphere or an inert gas atmosphere.

Note that the oxygen adding treatment performed on the oxide 330 can promote a reaction in which oxygen vacancies in the oxide 330 are filled with supplied oxygen, i.e., a reaction of Vo+O→null. Furthermore, hydrogen remaining in the oxide 330 reacts with supplied oxygen, so that the hydrogen can be removed as $H_2O$ (dehydration). This can inhibit recombination of hydrogen remaining in the oxide 330 with oxygen vacancies and formation of VoH.

Note that the insulators 322 and 324 may each have a stacked-layer structure of two or more layers. In that case, the stacked layers are not necessarily formed of the same material and may be formed of different materials. The insulator 324 may be formed into an island shape overlapping with the oxide 330a. In that case, the insulator 375 is in contact with a side surface of the insulator 324 and a top surface of the insulator 322.

Note that the insulator 322, the insulator 324, the conductor 305, and the transistor 110 in the above description can be replaced with the insulator 327, the insulator 328, the conductor 353, and the transistor 120.

The oxide 343 is provided over the oxide 330b_1. The oxide 343 is preferably provided to overlap with the conductor 342. Similarly, the oxide 345 is provided over the oxide 330b_2. The oxide 345 is preferably provided to overlap with the conductor 344.

The oxide 343 and the oxide 345 preferably have a function of inhibiting oxygen transmission. The oxide 343, which has a function of inhibiting oxygen transmission, is preferably provided between the conductor 342 and the oxide 330b_1, in which case the electrical resistance between the conductor 342 and the oxide 330b_1 can be reduced. Similarly, the oxide 345, which has a function of inhibiting oxygen transmission, is preferably provided between the conductor 344 and the oxide 330b_2, in which case the electrical resistance between the conductor 344 and the oxide 330b2 can be reduced.

Such a structure improves the electrical characteristics and reliability of the transistor 120 and the transistor 110. In the case where the electrical resistance between the conductor 342 and the oxide 330b_1 can be sufficiently reduced, the oxide 343 is not necessarily provided. In the case where the electrical resistance between the conductor 344 and the oxide 330b2 can be sufficiently reduced, the oxide 345 is not necessarily provided.

A metal oxide containing the element M may be used as the oxides 343 and 345. In particular, aluminum, gallium, yttrium, or tin is preferably used as the element M, for example. The concentration of the element M in the oxides 343 and 345 is preferably higher than that in the oxide 330$b$. Alternatively, gallium oxide may be used as the oxides 343 and 345. A metal oxide such as an In-M-Zn oxide may be used as the oxides 343 and 345. Specifically, the atomic ratio of the element M to In in the metal oxide used as the oxides 343 and 345 is preferably higher than that in the metal oxide used as the oxide 330$b$. The thickness of each of the oxides 343 and 345 preferably ranges from 0.5 nm to 5 nm, further preferably from 1 nm to 3 nm, and still further preferably from 1 nm to 2 nm. The oxides 343 and 345 preferably have crystallinity. The oxides 343 and 345 with crystallinity efficiently inhibits release of oxygen from the oxide 330. When the oxides 343 and 345 have a hexagonal crystal structure, for example, release of oxygen from the oxide 330 can sometimes be inhibited.

For the conductors 342 and 344, for example, a nitride containing tantalum, a nitride containing titanium, a nitride containing molybdenum, a nitride containing tungsten, a nitride containing tantalum and aluminum, a nitride containing titanium and aluminum, or the like is preferably used. In one embodiment of the present invention, a nitride containing tantalum is particularly preferable. As another example, ruthenium oxide, ruthenium nitride, oxide containing strontium and ruthenium, or an oxide containing lanthanum and nickel may be used. These materials are preferable because they are a conductive material that is not easily oxidized or a material that maintains the conductivity even when absorbing oxygen.

Note that hydrogen contained in the oxide 330$b$ or the like diffuses into the conductor 342 or 344 in some cases. In particular, when a nitride containing tantalum is used for the conductors 342 and 344, hydrogen contained in the oxide 330$b$ or the like is likely to diffuse into the conductor 342 or 344, and the diffused hydrogen is bonded to nitrogen contained in the conductor 342 or 344 in some cases. That is, hydrogen contained in the oxide 330$b$ or the like is sometimes absorbed by the conductor 342 or 344 in some cases.

No curved surface is preferably formed between the side surface and the top surface of the conductor 342 and between the side surface and the top surface of the conductor 344. The conductor 344 without a curved surface can have a large cross-sectional area in the channel width direction. Accordingly, the resistance value of the conductor 344 is reduced, so that the on-state current of the transistor 120 can be increased. In a similar manner, the conductor 342 can have a large cross-sectional area in the channel width direction. Accordingly, the resistance value of the conductor 342 is reduced, so that the on-state current of the transistor 110 can be increased.

The insulator 375 is provided to cover the insulator 324, the oxide 330$a\_1$, the oxide 330$b\_1$, the oxide 343, and the conductor 342, and an opening is formed in a region where the insulator 350, the conductor 360, and the like are provided. The insulator 375 is preferably provided in contact with the top surface of the insulator 324, the side surface of the oxide 330$a$1, the side surface of the oxide 330$b\_1$, the side surface of the oxide 343, the side surface of the conductor 342, and the top surface of the conductor 342. The insulator 375 preferably functions as a barrier insulating film for inhibiting transmission of oxygen. The insulator 375 also preferably functions as a barrier insulating film for inhibiting diffusion of impurities such as water and hydrogen into the oxide 330$a$1, the oxide 330$b\_1$, or the insulator 324 from the above. In addition, the insulator 375 preferably has a function of capturing impurities such as hydrogen.

The insulator 329 is provided to cover the insulator 328, the oxide 330$a\_2$, the oxide 330$b\_2$, the oxide 345, and the conductor 344, and an opening is formed in a region where the insulator 351, the conductor 361, and the like are provided. The insulator 329 is preferably provided in contact with the top surface of the insulator 328, the side surface of the oxide 330$a$2, the side surface of the oxide 330$b\_2$, the side surface of the oxide 345, the side surface of the conductor 344, and the top surface of the conductor 344. The insulator 329 preferably functions as a barrier insulating film for inhibiting transmission of oxygen. The insulator 329 also preferably functions as a barrier insulating film for inhibiting diffusion of impurities such as water and hydrogen into the oxide 330$a$1, the oxide 330$b\_1$, or the insulator 328 from the above. In addition, the insulator 329 preferably has a function of capturing impurities such as hydrogen.

The insulators 375 and 329 may be formed using an insulator such as aluminum oxide or silicon nitride.

When the above insulators 375 and 329 are provided, the conductors 342 and 344 can be surrounded by the insulators having a barrier property against oxygen. That is, oxygen contained in the insulator 380 can be prevented from diffusing into the conductors 342 and 344. As a result, the conductor 342 can be inhibited from being directly oxidized by oxygen or the like contained in the insulator 380, so that an increase in resistivity and a reduction in field-effect mobility and on-state current can be inhibited. It is also possible to inhibit the conductor 344 from being directly oxidized by oxygen or the like contained in the insulator 384, so that an increase in resistivity and a reduction in field-effect mobility and on-state current can be inhibited. Thus, the field-effect mobility and on-state current of the transistor 120 can be increased to increase the writing speed of the memory cell 10. In addition, the field-effect mobility and on-state current of the transistor 110 can be increased to increase the reading speed of the memory cell 10.

The insulator 375, which has a function of capturing impurities such as hydrogen, is provided in contact with the insulator 380 in a region interposed between the insulator 312 and the insulator 336, whereby impurities such as hydrogen contained in the insulator 380 and the like can be captured and the amount of hydrogen in the region can be kept constant. Furthermore, the insulator 329 having a function of capturing impurities such as hydrogen is provided in contact with the insulator 384, whereby impurities such as hydrogen contained in the insulator 384 and the like can be captured and the amount of hydrogen in the region can be kept constant. In that case, aluminum oxide or the like is preferably used for the insulator 375 and the insulator 329.

The insulators 350 and 351 functioning as gate insulators are preferably placed on and in contact with the oxide 330$b$. The insulators 350 and 351 can be formed using silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, or the like. Silicon oxide and silicon oxynitride, which have thermal stability, are particularly preferable.

As in the insulator 324, the concentration of impurities such as water and hydrogen in the insulators 350 and 351 is preferably lowered. The thickness of each of the insulators 350 and 351 is preferably greater than or equal to 1 nm and less than or equal to 20 nm.

A metal oxide may be provided between the insulator 350 and the conductor 360. The metal oxide preferably inhibits oxygen diffusion from the insulator 350 into the conductor 360. When the metal oxide that inhibits oxygen diffusion is provided, diffusion of oxygen from the insulator 350 into the conductor 360 can be inhibited, that is, a reduction in the amount of oxygen supplied to the oxide 330 can be inhibited. Moreover, oxidation of the conductor 360 due to oxygen in the insulator 350 can be inhibited. Similarly, a metal oxide may be provided between the insulator 351 and the conductor 361. For example, hafnium oxide can be used as the metal oxide.

Note that the metal oxide may function as part of the first gate electrode. For example, a metal oxide that can be used as the oxide 330 can be used as the metal oxide. In that case, when the conductor 360a and/or the conductor 361a is formed by a sputtering method, the metal oxide can have a reduced electrical resistance and become a conductor. Such a conductor can be referred to as an oxide conductor (OC) electrode.

With the metal oxide, the on-state current of the transistor 110 can be increased without a reduction in the influence of the electric field applied from the conductor 360. Since the distance between the conductor 360 and the oxide 330 is kept by the physical thicknesses of the insulator 350 and the metal oxide, leakage current between the conductor 360 and the oxide 330 can be reduced. Moreover, with the stacked-layer structure of the insulator 350 and the metal oxide, the physical distance between the conductor 360 and the oxide 330 and the intensity of electric fields applied from the conductor 360 to the oxide 330 can be easily adjusted as appropriate. The same applies to the insulator 351 and the conductor 361.

The conductor 360 preferably includes the conductor 360a and the conductor 360b over the conductor 360a. The conductor 361 preferably includes the conductor 361a and the conductor 361b over the conductor 361a. For example, the conductor 360a is preferably positioned so as to overlap with the bottom and side surfaces of the conductor 360b. The conductor 361a is preferably positioned so as to overlap with the bottom and side surfaces of the conductor 361b.

In this embodiment and the like, the conductor 360 has a two-layer structure of the conductor 360a and the conductor 360b and the conductor 361 has a two-layer structure of the conductor 361a and the conductor 361b; however, the conductor 360 and the conductor 361 may each have a single-layer structure or a stacked-layer structure of three or more layers.

The conductors 360a and 361a are preferably formed using a conductive material having a function of inhibiting diffusion of impurities such as a hydrogen atom, a hydrogen molecule, a water molecule, a nitrogen atom, a nitrogen molecule, a nitrogen oxide molecule, and a copper atom. Alternatively, the conductors 360a and 361a are preferably formed using a conductive material having a function of inhibiting diffusion of oxygen.

When the conductor 360a has a function of inhibiting diffusion of oxygen, the conductivity of the conductor 360b can be prevented from being lowered because of oxidization of the conductor 360b due to oxygen in the insulator 350. When the conductor 361a has a function of inhibiting diffusion of oxygen, the conductivity of the conductor 361b can be prevented from being lowered because of oxidization of the conductor 361b due to oxygen in the insulator 351. As a conductive material used for the conductor 360a and/or the conductor 361a, a conductive material similar to that of the conductor 305a and/or the conductor 305c may be used.

The conductors 360 and 361 also function as a wiring and thus are preferably a conductor having high conductivity. For example, a conductive material containing tungsten, copper, or aluminum as its main component can be used for the conductors 360b and 361b. The conductors 360b and 361b may each have a stacked-layer structure, for example, a stacked-layer structure of titanium or titanium nitride and the above conductive material.

In the transistor 110, the conductor 360 is formed in a self-aligned manner so as to fill an opening formed in the insulator 380 and the like. In the transistor 120, the conductor 361 is formed in a self-aligned manner so as to fill an opening formed in the insulator 384 and the like. In this manner, the conductor 360 can be arranged in a region between the conductor 342a and the conductor 342b without alignment. The same applies to the conductor 361.

In the channel width direction of the transistor 110, the bottom surface of the conductor 360 in a region where the conductor 360 and the oxide 330b do not overlap with each other is preferably lower in level than the bottom surface of the oxide 330b. When the conductor 360 functioning as the gate electrode covers the side and top surfaces of the channel formation region in the oxide 330b1 with the insulator 350 and the like therebetween, the electric field of the conductor 360 is likely to affect the entire channel formation region in the oxide 330b_1. Hence, the transistor 110 can have a higher on-state current and higher frequency characteristics. In a region where the oxide 330_1 and the conductor 360 do not overlap with each other, the difference between the height from the bottom surface of the insulator 322 to the bottom surface of the conductor 360 and the height from the bottom surface of the insulator 322 to the bottom surface of the oxide 330b_1 is greater than or equal to 0 nm and less than or equal to 100 nm, preferably greater than or equal to 3 nm and less than or equal to 50 nm, and further preferably greater than or equal to 5 nm and less than or equal to 20 nm.

The insulator 380 is provided over the insulator 375, and an opening is formed in a region where the insulator 350 and the conductor 360 are provided. The insulator 384 is provided over the insulator 329, and an opening is formed in a region where the insulator 351 and the conductor 361 are provided. The top surfaces of the insulators 380 and 384 may be planarized.

The insulator 380 and the insulator 384 which function as an interlayer film preferably have a low dielectric constant. The insulator 380 is preferably provided using a material similar to that for the insulator 316, for example. In particular, silicon oxide and silicon oxynitride, which are thermally stable, are preferable. Materials such as silicon oxide, silicon oxynitride, and porous silicon oxide are particularly preferable because a region containing oxygen released by heating can be easily formed.

Like the insulator 324, the insulators 380 and 384 preferably include an excess-oxygen region or excess oxygen. The concentration of impurities such as water and hydrogen in the insulators 380 and 384 is preferably reduced. For example, an oxide containing silicon such as silicon oxide or silicon oxynitride can be used for the insulators 380 and 384, as appropriate. When such an insulator containing excess oxygen is provided in the vicinity of the oxide 330, oxygen vacancies in the oxide 330 can be reduced, leading to an improvement in the reliability of the transistor.

The insulator 334 is provided in contact with the top surfaces of the conductor 361, the insulator 351, and the insulator 384. The insulator 334 preferably functions as a barrier insulating film that inhibits impurities such as water and hydrogen from diffusing into the insulator 384 from the above and also has a function of capturing impurities such as hydrogen. The insulator 334 also preferably functions as a barrier insulating film for inhibiting transmission of oxygen. As the insulator 334, for example, an insulator such as aluminum oxide can be used. The insulator 334, which has a function of capturing impurities such as hydrogen, is provided in contact with the insulator 384 in a region interposed between the insulator 312 and the insulator 378, whereby impurities such as hydrogen contained in the insulator 384 and the like can be captured and the amount of hydrogen in the region can be kept constant.

The insulator 335 is provided in contact with the top surfaces of the conductor 360, the insulator 350, and the insulator 380. The insulator 335 functions like the insulator 334.

The insulator 336 functions as a barrier insulating film that inhibits impurities such as water and hydrogen from diffusing into the insulator 384 from the above. The insulator 336 is provided over the insulator 384. The insulator 336 is preferably formed using a nitride containing silicon such as silicon nitride or silicon nitride oxide. For example, silicon nitride deposited by a sputtering method may be used for the insulator 336. When the insulator 336 is formed by a sputtering method, a high-density silicon nitride film where a void is unlikely to be formed can be obtained. To obtain the insulator 336, silicon nitride deposited by a CVD method may be stacked over silicon nitride deposited by a sputtering method.

[Constituent Materials for Semiconductor Device]

Constituent materials that can be used for the memory cell 10, which is a memory device of one embodiment of the present invention, a semiconductor device including the memory cell 10, and the like will be described below.

[Substrate]

The memory cell 10, which is a memory device of one embodiment of the present invention, a semiconductor device including the memory cell 10, and the like can be provided over a substrate. As the substrate, an insulator substrate, a semiconductor substrate, or a conductor substrate may be used, for example. Examples of the insulator substrate include a glass substrate, a quartz substrate, a sapphire substrate, a stabilized zirconia substrate (e.g., an yttria-stabilized zirconia substrate), and a resin substrate. Examples of the semiconductor substrate include a semiconductor substrate using silicon, germanium, or the like as a material and a compound semiconductor substrate including silicon carbide, silicon germanium, gallium arsenide, indium phosphide, zinc oxide, or gallium oxide. Another example is a semiconductor substrate in which an insulator region is included in the semiconductor substrate, e.g., an SOI (Silicon On Insulator) substrate. Examples of the conductor substrate include a graphite substrate, a metal substrate, an alloy substrate, and a conductive resin substrate. Other examples include a substrate including a metal nitride and a substrate including a metal oxide. Other examples include an insulator substrate provided with a conductor or a semiconductor, a semiconductor substrate provided with a conductor or an insulator, and a conductor substrate provided with a semiconductor or an insulator. Alternatively, these substrates provided with elements may be used. Examples of the element provided for the substrate include a capacitor element, a resistor, a switching element, a light-emitting element, and a memory element.

[Insulator]

Examples of the insulator include an oxide, a nitride, an oxynitride, a nitride oxide, a metal oxide, a metal oxynitride, and a metal nitride oxide, each of which has an insulating property.

As miniaturization and high integration of transistors progress, for example, a problem such as a leakage current may arise because of a thinner gate insulator. When a high-k material is used for the insulator functioning as a gate insulator, the voltage during the operation of the transistor can be lowered while the physical thickness of the gate insulator is maintained. In contrast, when a material with a low relative permittivity is used for the insulator functioning as an interlayer film, parasitic capacitance generated between wirings can be reduced. Thus, a material is preferably selected depending on the function of an insulator.

Examples of the insulator with a high relative permittivity include gallium oxide, hafnium oxide, zirconium oxide, an oxide containing aluminum and hafnium, an oxynitride containing aluminum and hafnium, an oxide containing silicon and hafnium, an oxynitride containing silicon and hafnium, and a nitride containing silicon and hafnium.

Examples of the insulator with a low relative permittivity include silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, and a resin.

When a transistor using metal oxide is surrounded by an insulator having a function of inhibiting passage of oxygen and impurities such as hydrogen, the transistor can have stable electrical characteristics. As the insulator having a function of inhibiting passage of oxygen and impurities such as hydrogen, a single layer or stacked layers of an insulator containing, for example, boron, carbon, nitrogen, oxygen, fluorine, magnesium, aluminum, silicon, phosphorus, chlorine, argon, gallium, germanium, yttrium, zirconium, lanthanum, neodymium, hafnium, or tantalum are used. Specifically, as the insulator having a function of inhibiting passage of oxygen and impurities such as hydrogen, a metal oxide such as aluminum oxide, magnesium oxide, gallium oxide, germanium oxide, yttrium oxide, zirconium oxide, lanthanum oxide, neodymium oxide, hafnium oxide, or tantalum oxide; or a metal nitride such as aluminum nitride, silicon nitride oxide, or silicon nitride can be used.

The insulator functioning as the gate insulator is preferably an insulator including a region containing oxygen released by heating. For example, when a structure is employed in which silicon oxide or silicon oxynitride including a region containing oxygen released by heating is in contact with the oxide 330, oxygen vacancies contained in the oxide 330 can be filled.

[Conductor]

As a conductor, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, lanthanum, and the like; an alloy containing any of the above metal elements; an alloy containing a combination of the above metal elements; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. In addition, tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that retain their conductivity even after absorbing oxygen. A semiconductor having high electrical conductivity, typified by polycrystalline silicon containing an impurity element such as phosphorus, or silicide such as nickel silicide may be used.

A stack of a plurality of conductive layers formed of the above materials may be used. For example, a stacked-layer structure combining a material containing the above metal element and a conductive material containing oxygen may be employed. A stacked-layer structure combining a material containing the above metal element and a conductive material containing nitrogen may be employed. A stacked-layer structure combining a material containing the above metal element, a conductive material containing oxygen, and a conductive material containing nitrogen may be employed.

In the case where an oxide is used for the channel formation region of the transistor, the conductor functioning as the gate electrode preferably employs a stacked-layer structure combining a material containing the above metal element and a conductive material containing oxygen. In that case, the conductive material containing oxygen is preferably provided on the channel formation region side. When the conductive material containing oxygen is provided on the channel formation region side, oxygen released from the conductive material is easily supplied to the channel formation region.

For the conductor functioning as the gate electrode, it is particularly preferable to use a conductive material containing oxygen and a metal element contained in the metal oxide where the channel is formed. A conductive material containing the above metal element and nitrogen may be used. For example, a conductive material containing nitrogen, such as titanium nitride or tantalum nitride, may be used. Indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon is added may be used. Furthermore, indium gallium zinc oxide containing nitrogen may be used. With the use of such a material, hydrogen contained in the metal oxide where the channel is formed can be captured in some cases. Alternatively, hydrogen entering from an external insulator or the like can be captured in some cases.

[Metal Oxide]

A metal oxide functioning as a semiconductor (an oxide semiconductor) is preferably used as the oxide 330. A metal oxide that can be used as the oxide 330 of the present invention will be described below.

The metal oxide preferably contains at least indium or zinc. In particular, indium and zinc are preferably contained. Furthermore, aluminum, gallium, yttrium, tin, or the like is preferably contained in addition to them. Furthermore, one kind or a plurality of kinds selected from boron, titanium, iron, nickel, germanium, zirconium, molybdenum, lanthanum, cerium, neodymium, hafnium, tantalum, tungsten, magnesium, cobalt, and the like may be contained.

Here, the case where the metal oxide is an In-M-Zn oxide containing indium, the element M, and zinc is considered.

Note that in this specification and the like, a metal oxide containing nitrogen is also collectively referred to as a metal oxide in some cases. A metal oxide containing nitrogen may be referred to as a metal oxynitride.

[Classification of Crystal Structure]

First, the classification of the crystal structures of an oxide semiconductor will be described with reference to FIG. 6A. FIG. 6A is a diagram showing the classification of crystal structures of an oxide semiconductor, typically IGZO (a metal oxide containing In, Ga, and Zn).

As shown in FIG. 6A, an oxide semiconductor is roughly classified into "Amorphous," "Crystalline," and "Crystal." The term "Amorphous" includes completely amorphous. The term "Crystalline" includes CAAC (c-axis-aligned crystalline), nc (nanocrystalline), and CAC (cloud-aligned composite) (excluding single crystal and poly crystal). Note that the term "Crystalline" excludes single crystal, poly crystal, and completely amorphous. The term "Crystal" includes single crystal and poly crystal.

Note that the structures in the thick frame in FIG. 6A are in an intermediate state between "Amorphous" and "Crystal," and belong to a new crystalline phase. That is, these structures are completely different from "Amorphous," which is energetically unstable, and "Crystal."

A crystal structure of a film or a substrate can be evaluated with an X-ray diffraction (XRD) spectrum. FIG. 6B shows an XRD spectrum, which is obtained by GIXD (Grazing-Incidence XRD) measurement, of a CAAC-IGZO film classified into "Crystalline." Note that a GIXD method is also referred to as a thin film method or a Seemann-Bohlin method. The XRD spectrum that is shown in FIG. 6B and obtained by GIXD measurement is hereinafter simply referred to as an XRD spectrum. The CAAC-IGZO film in FIG. 6B has a composition in the vicinity of In:Ga:Zn=4:2:3 [atomic ratio]. The CAAC-IGZO film in FIG. 6B has a thickness of 500 nm.

As shown in FIG. 6B, a clear peak indicating crystallinity is detected in the XRD spectrum of the CAAC-IGZO film. Specifically, a peak indicating c-axis alignment is detected at $2\theta$ of around 31° in the XRD spectrum of the CAAC-IGZO film. As shown in FIG. 6B, the peak at $2\theta$ of around 31° is asymmetric with respect to the axis of the angle at which the peak intensity is detected.

A crystal structure of a film or a substrate can also be evaluated with a diffraction pattern obtained by a nanobeam electron diffraction (NBED) method (such a pattern is also referred to as a nanobeam electron diffraction pattern). FIG. 6C shows a diffraction pattern of the CAAC-IGZO film. FIG. 6C shows a diffraction pattern obtained with the NBED method in which an electron beam is incident in the direction parallel to the substrate. The composition of the CAAC-IGZO film in FIG. 6C is In:Ga:Zn=4:2:3 [atomic ratio] or the neighborhood thereof. In the nanobeam electron diffraction method, electron diffraction is performed with a probe diameter of 1 nm.

As shown in FIG. 6C, a plurality of spots indicating c-axis alignment are observed in the diffraction pattern of the CAAC-IGZO film.

[Structure of Oxide Semiconductor]

Oxide semiconductors might be classified in a manner different from that in FIG. 6A when classified in terms of the crystal structure. Oxide semiconductors are classified into a single crystal oxide semiconductor and a non-single-crystal oxide semiconductor, for example. Examples of the non-single-crystal oxide semiconductor include the above-described CAAC-OS and nc-OS. Other examples of the non-single-crystal oxide semiconductor include a polycrystalline oxide semiconductor, an amorphous-like oxide semiconductor (a-like OS), and an amorphous oxide semiconductor.

Here, the above-described CAAC-OS, nc-OS, and a-like OS will be described in detail.

[CAAC-OS]

The CAAC-OS is an oxide semiconductor that has a plurality of crystal regions each of which has c-axis alignment in a particular direction. Note that the particular direction refers to the film thickness direction of a CAAC-OS film, the normal direction of the surface on which the CAAC-OS film is formed, or the normal direction of the surface of the CAAC-OS film. The crystal region refers to a region having a periodic atomic arrangement. When an atomic arrangement is regarded as a lattice arrangement, the crystal region also refers to a region with a uniform lattice arrangement. The CAAC-OS has a region where a plurality of crystal regions are connected in the a-b plane direction, and the region has distortion in some cases. Note that the distortion refers to a portion where the direction of a lattice arrangement changes between a region with a uniform lattice arrangement and another region with a uniform lattice arrangement in a region where a plurality of crystal regions are connected. That is, the CAAC-OS is an oxide semiconductor having c-axis alignment and having no clear alignment in the a-b plane direction.

Note that each of the plurality of crystal regions is formed of one or more fine crystals (crystals each of which has a maximum diameter of less than 10 nm). In the case where the crystal region is formed of one fine crystal, the maximum diameter of the crystal region is less than 10 nm. In the case where the crystal region is formed of a large number of fine crystals, the size of the crystal region may be approximately several tens of nanometers.

In the case of an In-M-Zn oxide, the CAAC-OS tends to have a layered crystal structure (also referred to as a layered structure) in which a layer containing indium (In) and oxygen (hereinafter, an In layer) and a layer containing the element M, zinc (Zn), and oxygen (hereinafter, an (M,Zn) layer) are stacked. Indium and the element M can be replaced with each other. Therefore, indium may be contained in the (M,Zn) layer. In addition, the element M may be contained in the In layer. Note that Zn may be contained in the In layer. Such a layered structure is observed as a lattice image in a high-resolution TEM image, for example.

When the CAAC-OS film is subjected to structural analysis by out-of-plane XRD measurement with an XRD apparatus using $\theta/2\theta$ scanning, for example, a peak indicating c-axis alignment is detected at $2\theta$ of 31° or around 31°. Note that the position of the peak indicating c-axis alignment (the value of $2\theta$) may change depending on the kind, composition, or the like of the metal element contained in the CAAC-OS.

For example, a plurality of bright spots are observed in the electron diffraction pattern of the CAAC-OS film. Note that one spot and another spot are observed point-symmetrically with a spot of the incident electron beam passing through a sample (also referred to as a direct spot) as the symmetric center.

When the crystal region is observed from the particular direction, a lattice arrangement in the crystal region is basically a hexagonal lattice arrangement; however, a unit lattice is not always a regular hexagon and is a non-regular hexagon in some cases. A pentagonal lattice arrangement, a heptagonal lattice arrangement, and the like are included in the distortion in some cases. Note that a clear crystal grain boundary (grain boundary) cannot be observed even in the vicinity of the distortion in the CAAC-OS. That is, formation of a crystal grain boundary is inhibited by the distortion of lattice arrangement. This is probably because the CAAC-OS can tolerate distortion owing to a low density of arrangement of oxygen atoms in the a-b plane direction, an interatomic bond distance changed by substitution of a metal atom, and the like.

A crystal structure in which a clear crystal grain boundary is observed is what is called polycrystal. It is highly probable that the crystal grain boundary becomes a recombination center and captures carriers and thus decreases the on-state current and field-effect mobility of a transistor, for example. Thus, the CAAC-OS in which no clear crystal grain boundary is observed is one of crystalline oxides having a crystal structure suitable for a semiconductor layer of a transistor. Note that Zn is preferably contained to form the CAAC-OS. For example, an In—Zn oxide and an In—Ga—Zn oxide are suitable because they can inhibit generation of a crystal grain boundary as compared with an In oxide.

The CAAC-OS is an oxide semiconductor with high crystallinity in which no clear crystal grain boundary is observed. Thus, in the CAAC-OS, a reduction in electron mobility due to the crystal grain boundary is unlikely to occur. Moreover, since the crystallinity of an oxide semiconductor might be decreased by entry of impurities, formation of defects, or the like, the CAAC-OS can be regarded as an oxide semiconductor that has small amounts of impurities and defects (e.g., oxygen vacancies). Thus, an oxide semiconductor including the CAAC-OS is physically stable. Therefore, the oxide semiconductor including the CAAC-OS is resistant to heat and has high reliability. In addition, the CAAC-OS is stable with respect to high temperature in the manufacturing process (what is called thermal budget). Accordingly, the use of the CAAC-OS for the OS transistor can extend the degree of freedom of the manufacturing process.

[nc-OS]

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. In other words, the nc-OS includes a fine crystal. Note that the size of the fine crystal is, for example, greater than or equal to 1 nm and less than or equal to 10 nm, particularly greater than or equal to 1 nm and less than or equal to 3 nm; thus, the fine crystal is also referred to as a nanocrystal. Furthermore, there is no regularity of crystal orientation between different nanocrystals in the nc-OS. Thus, the orientation in the whole film is not observed. Accordingly, the nc-OS cannot be distinguished from an a-like OS or an amorphous oxide semiconductor by some analysis methods. For example, when an nc-OS film is subjected to structural analysis by out-of-plane XRD measurement with an XRD apparatus using $\theta/2\theta$ scanning, a peak indicating crystallinity is not detected. Furthermore, a diffraction pattern like a halo pattern is observed when the nc-OS film is subjected to electron diffraction (also referred to as selected-area electron diffraction) using an electron beam with a probe diameter larger than the diameter of a nanocrystal (e.g., larger than or equal to 50 nm). Meanwhile, in some cases, a plurality of spots in a ring-like region with a direct spot as the center are observed in the obtained electron diffraction pattern when the nc-OS film is subjected to electron diffraction (also referred to as nanobeam electron diffraction) using an electron beam with a probe diameter nearly equal to or smaller than the diameter of a nanocrystal (e.g., 1 nm or larger and 30 nm or smaller).

[a-Like OS]

The a-like OS is an oxide semiconductor having a structure between those of the nc-OS and the amorphous oxide semiconductor. The a-like OS includes a void or a low-density region. That is, the a-like OS has low crystallinity as compared with the nc-OS and the CAAC-OS. Moreover, the a-like OS has higher hydrogen concentration in the film than the nc-OS and the CAAC-OS.

[Structure of Oxide Semiconductor]

Next, the above-described CAC-OS is described in detail. Note that the CAC-OS relates to the material composition.

[CAC-OS]

The CAC-OS refers to one composition of a material in which elements constituting a metal oxide are unevenly distributed with a size greater than or equal to 0.5 nm and less than or equal to 10 nm, preferably greater than or equal to 1 nm and less than or equal to 3 nm, or a similar size, for example. Note that a state in which one or more metal elements are unevenly distributed and regions including the metal element(s) are mixed with a size greater than or equal to 0.5 nm and less than or equal to 10 nm, preferably greater than or equal to 1 nm and less than or equal to 3 nm, or a similar size in a metal oxide is hereinafter referred to as a mosaic pattern or a patch-like pattern.

In addition, the CAC-OS has a composition in which materials are separated into a first region and a second region to form a mosaic pattern, and the first regions are distributed in the film (this composition is hereinafter also referred to as a cloud-like composition). That is, the CAC-OS is a composite metal oxide having a composition in which the first regions and the second regions are mixed.

Note that the atomic ratios of In, Ga, and Zn to the metal elements contained in the CAC-OS in an In—Ga—Zn oxide are denoted with [In], [Ga], and [Zn], respectively. For example, the first region in the CAC-OS in the In—Ga—Zn oxide has [In] higher than [In] in the composition of the CAC-OS film. Moreover, the second region has [Ga] higher than [Ga] in the composition of the CAC-OS film. For example, the first region has higher [In] and lower [Ga] than the second region. Moreover, the second region has higher [Ga] and lower [In] than the first region.

Specifically, the first region includes indium oxide, indium zinc oxide, or the like as its main component. The second region includes gallium oxide, gallium zinc oxide, or the like as its main component. That is, the first region can be referred to as a region containing In as its main component. The second region can be referred to as a region containing Ga as its main component.

Note that a clear boundary between the first region and the second region cannot be observed in some cases.

For example, in EDX mapping obtained by energy dispersive X-ray spectroscopy (EDX), it is confirmed that the CAC-OS in the In—Ga—Zn oxide has a composition in which the region containing In as its main component (the first region) and the region containing Ga as its main component (the second region) are unevenly distributed and mixed.

In the case where the CAC-OS is used for a transistor, a switching function (on/off switching function) can be given to the CAC-OS owing to the complementary action of the conductivity derived from the first region and the insulating property derived from the second region. A CAC-OS has a conducting function in part of the material and has an insulating function in another part of the material; as a whole, the CAC-OS has a function of a semiconductor. Separation of the conducting function and the insulating function can maximize each function. Accordingly, when the CAC-OS is used for a transistor, high on-state current ($I_{on}$), high field-effect mobility ($\mu$), and excellent switching operation can be achieved.

An oxide semiconductor has various structures with different properties. Two or more kinds among the amorphous oxide semiconductor, the polycrystalline oxide semiconductor, the a-like OS, the CAC-OS, the nc-OS, and the CAAC-OS may be included in an oxide semiconductor used for a semiconductor device of one embodiment of the present invention.

[Transistor Including Oxide Semiconductor]

Next, the case where the above oxide semiconductor is used for a transistor is described.

When the above oxide semiconductor is used for a transistor, a transistor with high field-effect mobility can be achieved. In addition, a transistor having high reliability can be achieved.

Furthermore, an oxide semiconductor with a low carrier concentration is preferably used for a channel formation region of the transistor. For example, the carrier concentration of the channel formation region of the oxide semiconductor is preferably lower than or equal to $1\times10^{18}$ cm$^{-3}$, further preferably lower than $1\times10^{17}$ cm$^{-3}$, still further preferably lower than $1\times10^{16}$ cm$^{-3}$, yet further preferably lower than $1\times10^{13}$ cm$^{-3}$, yet still further preferably lower than $1\times10^{12}$ cm$^{-3}$. In order to reduce the carrier concentration of an oxide semiconductor film, the impurity concentration in the oxide semiconductor film is reduced so that the density of defect states can be reduced. In this specification and the like, a state with a low impurity concentration and a low density of defect states is referred to as a highly purified intrinsic or substantially highly purified intrinsic state. Note that an oxide semiconductor having a low carrier concentration may be referred to as a highly purified intrinsic or substantially highly purified intrinsic oxide semiconductor.

A highly purified intrinsic or substantially highly purified intrinsic oxide semiconductor film has a low density of defect states and thus has a low density of trap states in some cases.

Charge trapped by the trap states in the oxide semiconductor takes a long time to disappear and might behave like fixed charge. Thus, a transistor whose channel formation region is formed in an oxide semiconductor with a high density of trap states has unstable electrical characteristics in some cases.

Accordingly, in order to obtain stable electrical characteristics of a transistor, reducing the impurity concentration in an oxide semiconductor is effective. In order to reduce the impurity concentration in the oxide semiconductor, it is preferable that the impurity concentration in a film provided in proximity be also reduced. Examples of impurities include hydrogen, nitrogen, an alkali metal, an alkaline earth metal, iron, nickel, and silicon.

[Impurities]

Here, the influence of each impurity in the oxide semiconductor is described.

When silicon or carbon, which is one of Group 14 elements, is contained in the oxide semiconductor, defect states are formed in the oxide semiconductor. Thus, the concentration of silicon or carbon in the channel formation region of the oxide semiconductor and the concentration of silicon or carbon in the vicinity of an interface with the channel formation region of the oxide semiconductor (the concentration obtained by secondary ion mass spectrometry (SIMS)) are each set lower than or equal to $2\times10^{18}$ atoms/cm$^3$, preferably lower than or equal to $2\times10^{17}$ atoms/cm$^3$.

When the oxide semiconductor contains an alkali metal or an alkaline earth metal, defect states are formed and carriers are generated in some cases. Thus, a transistor using an oxide semiconductor that contains an alkali metal or an alkaline earth metal is likely to have normally-on characteristics. Thus, the concentration of an alkali metal or an alkaline earth metal in the channel formation region of the oxide semiconductor, which is obtained by SIMS, is lower than or equal to $1\times10^{18}$ atoms/cm$^3$, preferably lower than or equal to $2\times10^{16}$ atoms/cm$^3$.

Furthermore, when the oxide semiconductor contains nitrogen, the oxide semiconductor easily becomes n-type by generation of electrons serving as carriers and an increase in carrier concentration. As a result, a transistor using an oxide semiconductor containing nitrogen as a semiconductor is likely to have normally-on characteristics. When nitrogen is contained in the oxide semiconductor, a trap state is sometimes formed. This might make the electrical characteristics of the transistor unstable. Therefore, the concentration of nitrogen in the channel formation region of the oxide semiconductor, which is obtained by SIMS, is set lower than $5\times10^{19}$ atoms/cm$^3$, preferably lower than or equal to $5\times10^{18}$ atoms/cm$^3$, further preferably lower than or equal to $1\times10^{18}$ atoms/cm$^3$, still further preferably lower than or equal to $5\times10^{17}$ atoms/cm$^3$.

Hydrogen contained in the oxide semiconductor reacts with oxygen bonded to a metal atom to be water, and thus forms an oxygen vacancy in some cases. Entry of hydrogen into the oxygen vacancy generates an electron serving as a carrier in some cases. Furthermore, bonding of part of hydrogen to oxygen bonded to a metal atom causes generation of an electron serving as a carrier in some cases. Thus, a transistor using an oxide semiconductor containing hydrogen is likely to have normally-on characteristics. Accordingly, hydrogen in the channel formation region of the oxide semiconductor is preferably reduced as much as possible. Specifically, the hydrogen concentration in the channel formation region of the oxide semiconductor, which is obtained by SIMS, is set lower than $1\times10^{20}$ atoms/cm$^3$, preferably lower than $5\times10^{19}$ atoms/cm$^3$, further preferably lower than $1\times10^{19}$ atoms/cm$^3$, still further preferably lower than $5\times10^{18}$ atoms/cm$^3$, further preferably lower than $1\times10^{18}$ atoms/cm$^3$.

When an oxide semiconductor with sufficiently reduced impurities is used for the channel formation region of the transistor, stable electrical characteristics can be given.

[Other Semiconductor Materials]

Semiconductor materials that can be used for the oxide 330 are not limited to the above-described metal oxides. A semiconductor material having a bandgap (a semiconductor material that is not a zero-gap semiconductor) may be used for the oxide 330. For example, a single element semiconductor such as silicon, a compound semiconductor such as gallium arsenide, or a layered material (also referred to as an atomic layered material or a two-dimensional material) is preferably used as a semiconductor material. In particular, a layered material functioning as a semiconductor is preferably used as a semiconductor material.

In this specification and the like, the layered material is a general term of a group of materials having a layered crystal structure. In the layered crystal structure, layers formed by covalent bonding or ionic bonding are stacked with bonding such as the Van der Waals force, which is weaker than covalent bonding or ionic bonding. The layered material has high electrical conductivity in a monolayer, that is, high two-dimensional electrical conductivity. When a material functioning as a semiconductor and having high two-dimensional electrical conductivity is used for a channel formation region, a transistor having a high on-state current can be provided.

Examples of the layered material include graphene, silicene, and chalcogenide. Chalcogenide is a compound containing chalcogen. Chalcogen is a general term of elements belonging to Group 16, which includes oxygen, sulfur, selenium, tellurium, polonium, and livermorium. Examples of chalcogenide include transition metal chalcogenide and chalcogenide of Group 13 elements.

As the oxide 330, a transition metal chalcogenide functioning as a semiconductor is preferably used, for example. Specific examples of the transition metal chalcogenide which can be used for the oxide 330 include molybdenum sulfide (typically $MoS_2$), molybdenum selenide (typically $MoSe_2$), molybdenum telluride (typically $MoTe_2$), tungsten sulfide ($WS_2$), tungsten selenide (typically $WSe_2$), tungsten telluride (typically $WTe_2$), hafnium sulfide ($HfS_2$), hafnium selenide ($HfSe_2$), zirconium sulfide ($ZrS_2$), and zirconium selenide ($ZrSe_2$).

This embodiment can be implemented in combination with any of the structures described in the other embodiments and the like, as appropriate.

Embodiment 2

In this embodiment, a structure example of a semiconductor device 200 including the memory cell 10 (also referred to as a "memory element") will be described.

Figure 7A:
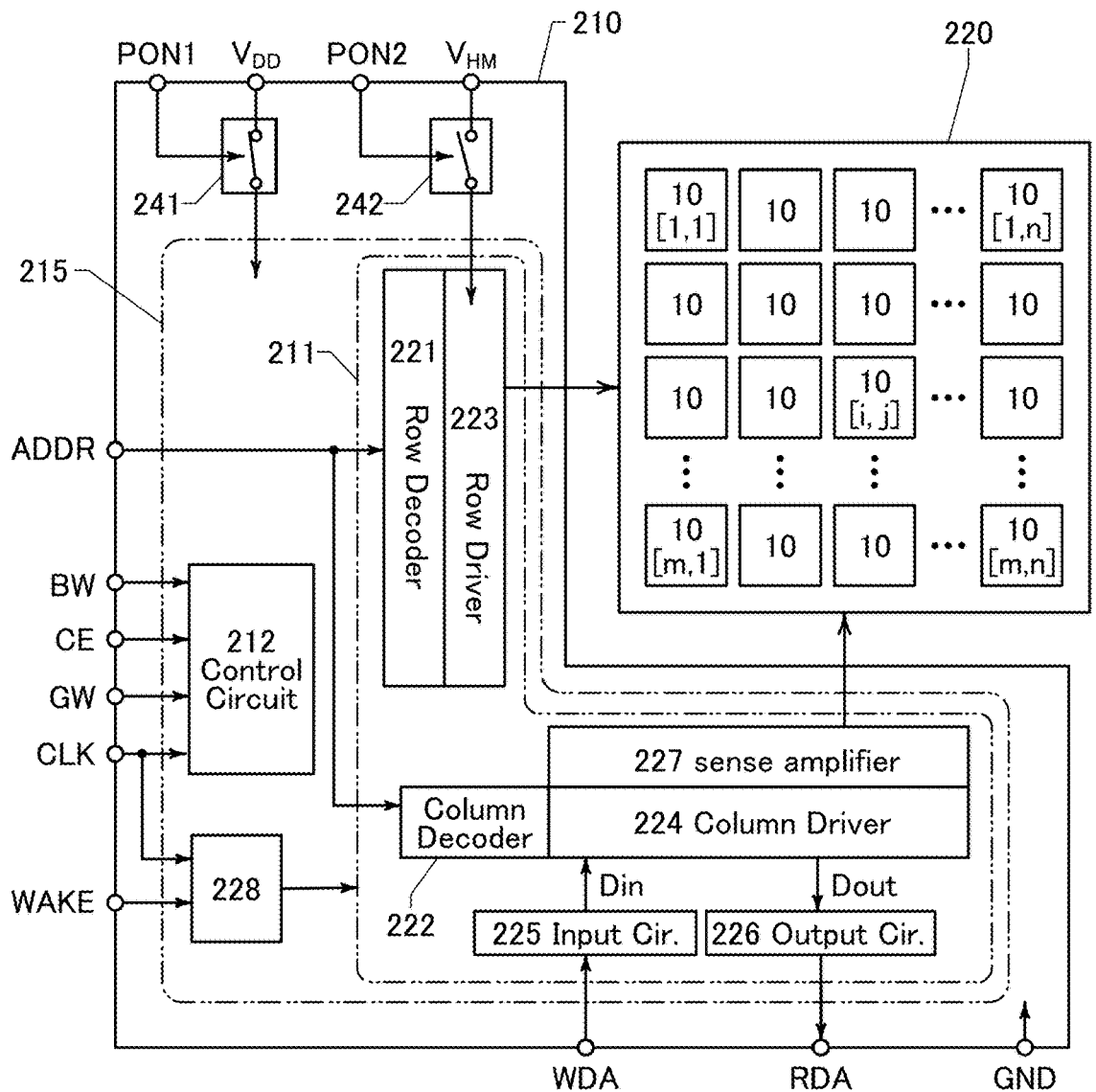
FIG. 7A is a block diagram illustrating a structure example of a semiconductor device.

FIG. 7A is a block diagram illustrating a configuration example of the semiconductor device 200 of one embodiment of the present invention. The semiconductor device 200 illustrated in FIG. 7A includes a driver circuit 210 and a memory array 220. The memory array 220 includes the plurality of memory cells 10. FIG. 7A illustrates an example in which the memory array 220 includes the plurality of memory cells 10 arranged in a matrix of m rows and n columns (each of m and n is an integer greater than or equal to 2).

Note that the rows and columns extend in the directions orthogonal to each other. In this embodiment, the X direction is referred to as a "row" and the Y direction is referred to as a "column", but the X direction may be referred to as a "column" and the Y direction may be referred to as a "row".

In FIG. 7A, the memory cell 10 in the first row and the first column is referred to as a memory cell 10[1, 1], and the memory cell 10 in the m-th row and the n-th column is referred to as a memory cell 10[m, n]. Similarly, the memory cell 10 in the i-th row and j-th column (i is an integer greater than or equal to 1 and less than or equal to m; and j is an integer greater than or equal to 1 and less than or equal to n) is referred to as a memory cell 10[i, j].

The driver circuit 210 includes a PSW (power switch) 241, a PSW 242, and a peripheral circuit 215. The peripheral circuit 215 includes a peripheral circuit 211, a control circuit 212, and a voltage generation circuit 228.

In the semiconductor device 200, each circuit, each signal, and each voltage can be appropriately selected as needed. Alternatively, another circuit or another signal may be added. A signal BW, a signal CE, a signal GW, a signal CLK, a signal WAKE, a signal ADDR, a signal WDA, a signal PON1, and a signal PON2 are signals input from the outside, and a signal RDA is a signal output to the outside. The signal CLK is a clock signal.

The signals BW, the signal CE, and the signal GW are control signals. The signal CE is a chip enable signal, the signal GW is a global write enable signal, and the signal BW is a byte write enable signal. The signal ADDR is an address signal. The signal WDA is write data, and the signal RDA is read data. The signal PON1 and the signal PON2 are power gating control signals. Note that the signal PON1 and the signal PON2 may be generated in the control circuit 212.

The control circuit 212 is a logic circuit having a function of controlling the overall operation of the semiconductor device 200. For example, the control circuit 212 performs a logical operation on the signal CE, the signal GW, and the signal BW to determine an operation mode of the semiconductor device 200 (e.g., a writing operation or a reading operation). Alternatively, the control circuit 212 generates a control signal for the peripheral circuit 211 so that the operation mode is executed The voltage generation circuit 228 has a function of generating a negative voltage. The signal WAKE has a function of controlling the input of the signal CLK to the voltage generation circuit 228. For example, when an H-level signal is applied as the signal WAKE, the signal CLK is input to the voltage generation circuit 228, and the voltage generation circuit 228 generates a negative voltage.

The peripheral circuit 211 is a circuit for writing and reading data to/from the memory cell 10. The peripheral circuit 211 includes a row decoder 221, a column decoder 222, a row driver 223, a column driver 224, an input circuit 225, an output circuit 226, and a sense amplifier 227.

The row decoder 221 and the column decoder 222 have a function of decoding the signal ADDR. The row decoder 221 is a circuit for specifying a row to be accessed, and the column decoder 222 is a circuit for specifying a column to be accessed. The row driver 223 has a function of selecting the wiring WL specified by the row decoder 221. The column driver 224 has a function of writing data to the memory cell 10, a function of reading data from the memory cell 10, a function of retaining the read data, and the like.

The input circuit 225 has a function of retaining the signal WDA. Data retained by the input circuit 225 is output to the column driver 224. Data output from the input circuit 225 is data (Din) to be written to the memory cell 10. Data (Dout) read from the memory cell 10 by the column driver 224 is output to the output circuit 226. The output circuit 226 has a function of retaining Dout. In addition, the output circuit 226 has a function of outputting Dout to the outside of the semiconductor device 200. Data output from the output circuit 226 is the signal RDA.

The PSW 241 has a function of controlling the supply of $V_{DD}$ to the peripheral circuit 215. The PSW 242 has a function of controlling the supply of $V_{HM}$ to the row driver 223. Here, in the semiconductor device 200, a high power supply voltage is $V_{DD}$ and a low power supply voltage is GND (a ground potential). In addition, $V_{HM}$ is a high power supply voltage used to set the word line to the H level and is higher than $V_{DD}$. The on/off of the PSW 241 is controlled by the signal PON1, and the on/off of the PSW 242 is controlled by the signal PON2. The number of power domains to which $V_{DD}$ is supplied is one in the peripheral circuit 215 in FIG. 7A but can be more than one. In this case, a power switch is provided for each power domain.

Figure 7B:
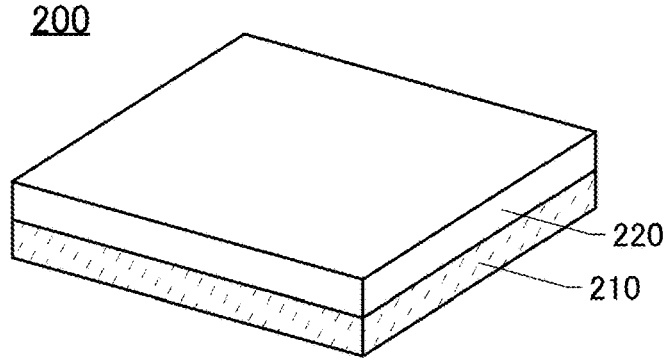
FIG. 7B is a perspective view illustrating a structure example of the semiconductor device.

The driver circuit 210 and the memory array 220 may be provided on the same plane. As illustrated in FIG. 7B, the driver circuit 210 and the memory array 220 may be provided to overlap with each other. When the driver circuit 210 and the memory array 220 overlap with each other, the signal transmission distance can be shortened. In addition, the semiconductor device 200 can be reduced in size.

FIG. 8A is a block diagram illustrating an arrangement example of the memory cells 10 in the memory array 220. The memory array 220 includes m wirings WBL and m wirings RBL which extend in the row direction, and n wirings WL, n wirings CL, n wirings SL, n wirings BGL2, and n wiring BGL1 which extend in the column direction (not illustrated).

FIG. 8B is a circuit diagram of the memory cell 10[$i$, $j$]. The memory cell 10[$i$, $j$] includes a transistor 120[$i$, $j$], a transistor 110[$i$, $j$], and a capacitor 130[$i$, $j$]. A gate of the transistor 120[$i$, $j$] is electrically connected to a wiring WL[1], which is the wiring WL in the j-th column, and a back gate thereof is electrically connected to a wiring BGL2[1], which is the wiring BGL2 in the j-th column. One of a source and a drain of the transistor 120[$i$, $j$] is electrically connected to a wiring WBL[$i$], which is the wiring WBL in the i-th row, and the other thereof is electrically connected to a gate of the transistor 110[$i$, $j$].

A back gate of the transistor 110[$i$, $j$] is electrically connected to a wiring BGL1[$j$], which is the wiring BGL1 in the j-th column. One of a source and a drain of the transistor 110[$i$, $j$] is electrically connected to a wiring RBL[$i$], which is the wiring RBL in the i-th row, and the other thereof is electrically connected to a wiring SL[$j$], which is the wiring SL in the j-th column.

The memory cell 10[$i$, $j$] includes the capacitor 130[$i$, $j$] between the gate of the transistor 110[$i$, $j$] and a wiring CL[$j$], which is the wiring CL in the j-th column. In this specification and the like, a node in which the other of the source and the drain of the transistor 120[$i$, $j$] is electrically connected to the gate of the transistor 110[$i$, $j$] is called a node FN[$i$, $j$]. Thus, the memory cell 10[$i$, $j$] includes the capacitor 130[$i$, $j$] between the node FN[$i$, $j$] and the wiring CL[$j$].

When a signal is supplied to the wiring WBL[$i$] and the wiring WL[$j$], data can be written to the memory cell 10[$i$, $j$]. When a signal is supplied to the wiring RBL[$i$] and the wiring SL[$j$], data held in the memory cell 10[$i$, $j$] can be read out. By controlling signals supplied to the wirings, data reading and data writing can be performed on a desired memory cell 10. Thus, the semiconductor device 200 can function as a NOR memory device.

Figure 9A:
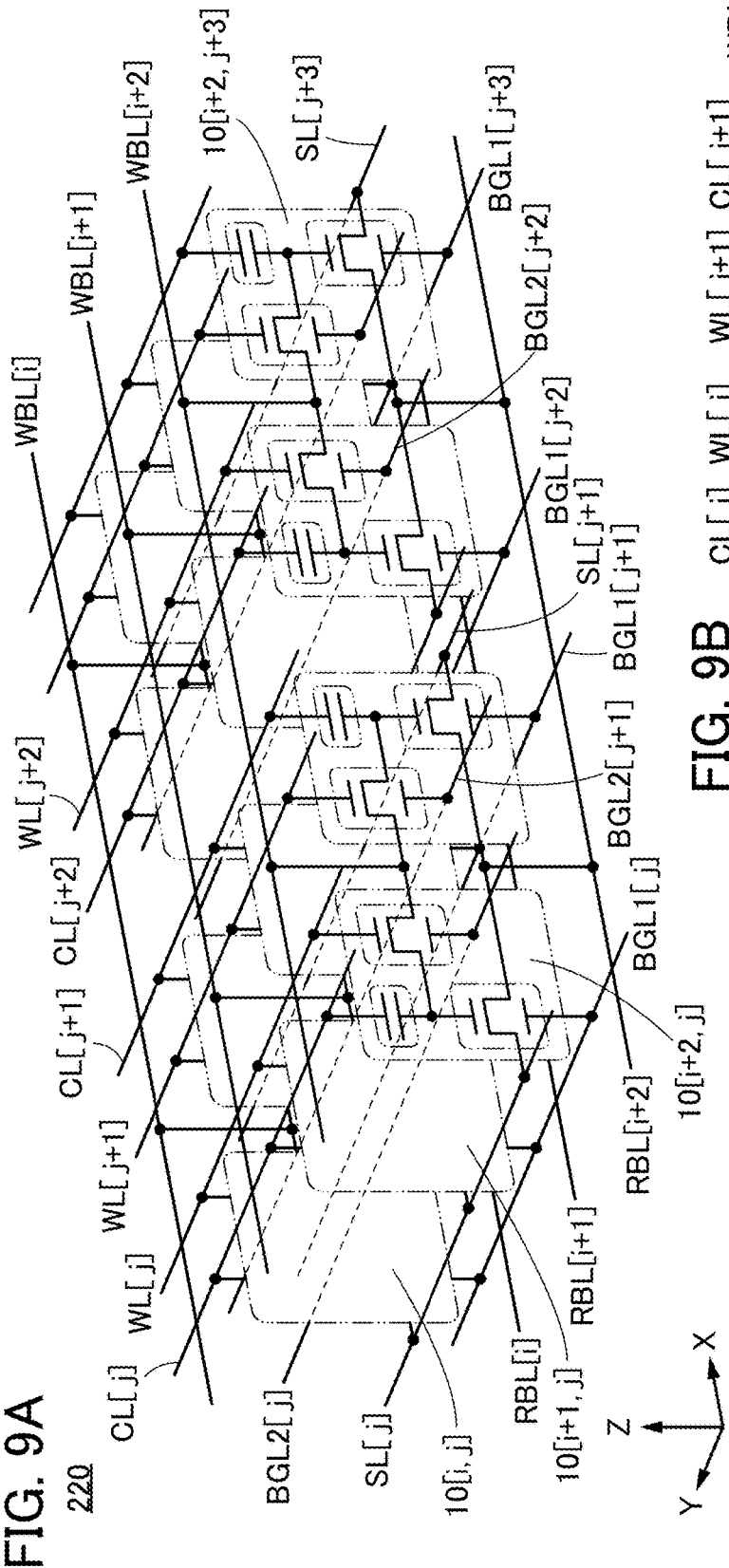
FIG. 9A is a block diagram illustrating a structure example of a cell array.

FIG. 9A is a block diagram illustrating an arrangement example of the memory cells 10 in the memory array 220, which is different from that in FIG. 8A.

Figure 9B:
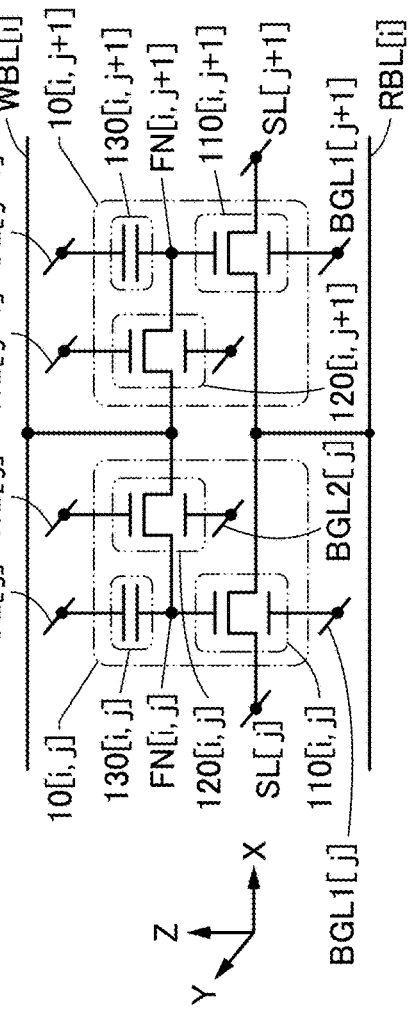
FIG. 9B is a circuit diagram of a memory cell.
Figure 10:
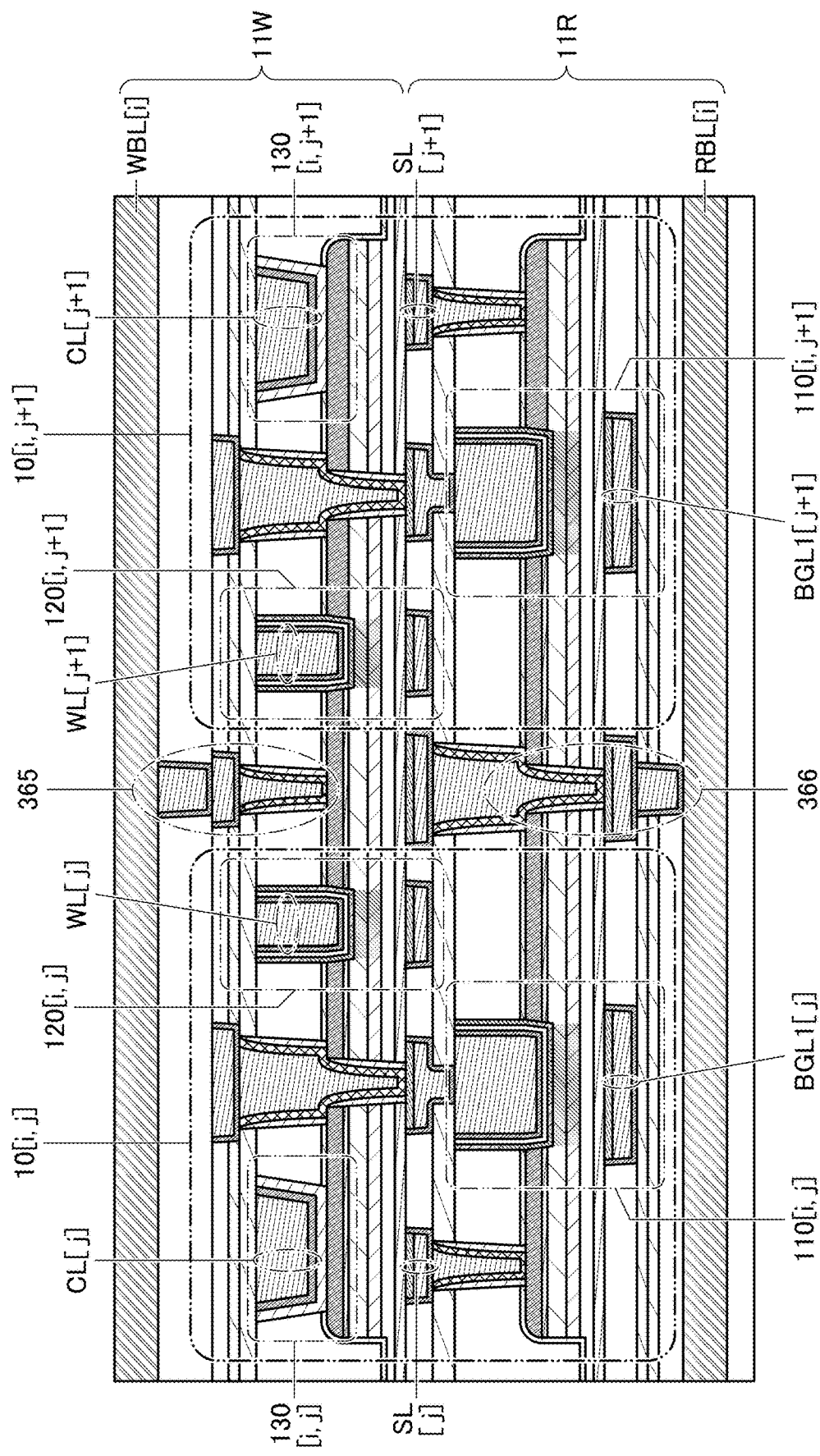
FIG. 10 is a cross-sectional view of a memory cell.

In the memory array 220 illustrated in FIG. 9A, the memory cells 10 in the odd-number columns and the memory cells 10 in the even-number columns are bilaterally symmetrically placed. FIG. 9B is a circuit diagram illustrating the memory cell 10[$i$, $j$] and a memory cell 10[$i$, $j$+1] in the case where j is an odd number. FIG. 10 illustrates an example of a cross-sectional structure of the memory cell 10[$i$, $j$] and the memory cell 10[$i$, $j$+1]. FIG. 10 is a cross-sectional view corresponding to FIG. 1B and FIG. 2.

One of the source and the drain of the transistor 120[$i$, $j$] and one of a source and a drain of the transistor 120[$i$, $j$+1] are each electrically connected to the wiring WBL[$i$]. By bilaterally symmetrical arrangement of the memory cells 10 in the odd-number column and the memory cells 10 in the even-number column, the transistor 120[$i$, $j$] and the transistor 120[$i$, $j$+1] both can be electrically connected to the wiring WBL[$i$] through a common connection path 365 (see FIG. 10).

Similarly, each of the transistor 110[$i$, $j$] and a transistor 110[$i$, $j$+1] can be electrically connected to the wiring RBL[$i$] through a common connection path 366. Accordingly, the area occupied by the memory array 220 can be further reduced. Furthermore, areal density per unit area can be further increased.

This embodiment can be implemented in combination with any of the structures described in the other embodiments and the like, as appropriate.

Embodiment 3

In this embodiment, application examples of the memory device of one embodiment of the present invention will be described.

Figure 11:
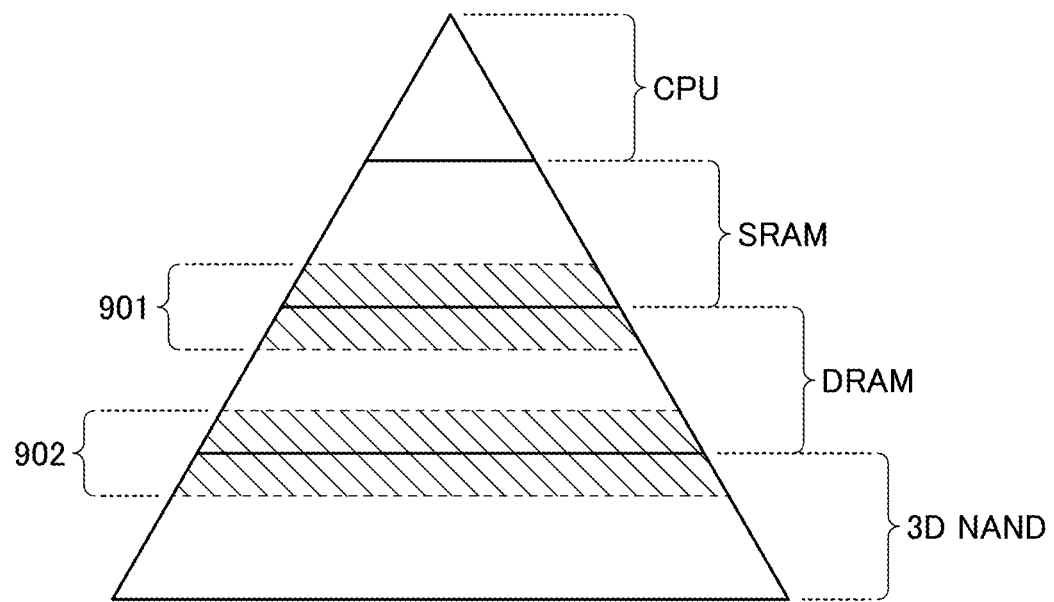
FIG. 11 illustrates a hierarchy of various kinds of memory devices.

In general, a variety of memory devices are used in semiconductor devices such as computers in accordance with the intended use. FIG. 11 shows a hierarchy diagram showing various memory devices with different levels. The memory devices at the upper levels require high access speeds, and the memory devices at the lower levels require large memory capacity and high record density. In FIG. 11, sequentially from the top level, a memory included as a register in an arithmetic processing device such as a CPU, a SRAM (Static Random Access Memory), a DRAM (Dynamic Random Access Memory), and a 3D NAND memory are shown.

A memory included as a register in an arithmetic processing device such as a CPU is used for temporary storage of arithmetic operation results, for example, and thus is frequently accessed by the arithmetic processing device. Accordingly, high operation speed is required rather than memory capacity. The register also has a function of retaining settings of the arithmetic processing device, for example.

An SRAM is used for a cache, for example. The cache has a function of retaining a copy of part of data retained in a main memory. Copying data which is frequently used and retaining the copy of the data in the cache facilitates rapid data access.

A DRAM is used for the main memory, for example. The main memory has a function of retaining a program or data which are read from the storage. The record density of a DRAM is approximately 0.1 to 0.3 Gbit/mm$^2$.

A 3D NAND memory is used for the storage, for example. The storage has a function of retaining data that needs to be stored for a long time and a variety of programs used in an arithmetic processing device, for example. Therefore, the storage needs to have a high memory capacity and a high memory density rather than operating speed. The record density of a memory device used for the storage is approximately 0.6 to 6.0 Gbit/mm$^2$.

The memory device of one embodiment of the present invention operates fast and can retain data for a long time. The memory device of one embodiment of the present invention can be favorably used as a memory device positioned in a boundary region 901 including both the level in which cache is positioned and the level in which main memory is positioned. The memory device of one embodiment of the present invention can be favorably used as a memory device positioned in a boundary region 902 including both the level in which main memory is positioned and the level in which the storage is positioned.

The memory device of one embodiment of the present invention can be applied to, for example, memory devices of a variety of electronic devices (e.g., information terminals, computers, smartphones, e-book readers, digital still cameras, video cameras, video recording/reproducing devices, navigation systems, and game machines). The memory device can also be used for image sensors, IoT (Internet of Things), healthcare, and the like. Here, the computers refer not only to tablet computers, notebook computers, and desktop computers, but also to large computers such as server systems.

Alternatively, the memory device of one embodiment off the present invention is applied to a variety of removable memory devices such as memory cards (e.g., SD cards), USB memories, and SSDs (solid state drives). FIG. 12A to FIG. 12E schematically show some structure examples of removable memory devices. The memory device of one embodiment of the present invention is processed into a packaged memory chip and used in a variety of memory devices and removable memories, for example.

Figure 12A:
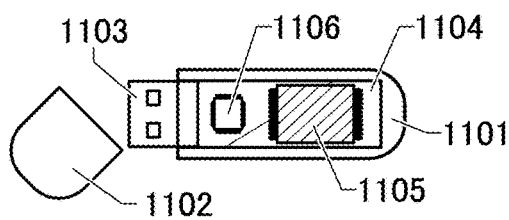
FIG. 12A to FIG. 12E each illustrate an application example of a memory device.

FIG. 12A is a schematic diagram of a USB memory. A USB memory 1100 includes a housing 1101, a cap 1102, a USB connector 1103, and a substrate 1104. The substrate 1104 is held in the housing 1101. The substrate 1104 is provided with a memory chip 1105 and a controller chip 1106, for example. The semiconductor device described in the above embodiment can be incorporated in the memory chip 1105 or the like on the substrate 1104.

Figure 12B:
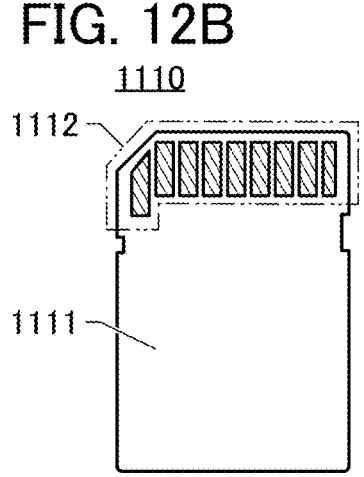
Figure 12C:
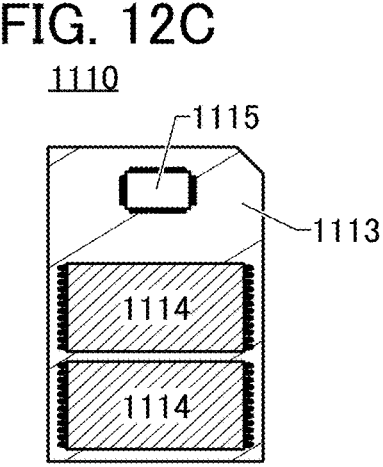

FIG. 12B is a schematic external diagram of an SD card, and FIG. 12C is a schematic diagram of the internal structure of the SD card. An SD card 1110 includes a housing 1111, a connector 1112, and a substrate 1113. The substrate 1113 is held in the housing 1111. The substrate 1113 is provided with a memory chip 1114 and a controller chip 1115, for example. When the memory chip 1114 is also provided on the back side of the substrate 1113, the capacity of the SD card 1110 can be increased. In addition, a wireless chip with a radio communication function may be provided on the substrate 1113. In this case, data can be read from and written in the memory chip 1114 by radio communication between a host device and the SD card 1110. The semiconductor device described in the above embodiment can be incorporated in the memory chip 1114 or the like on the substrate 1113.

Figure 12D:
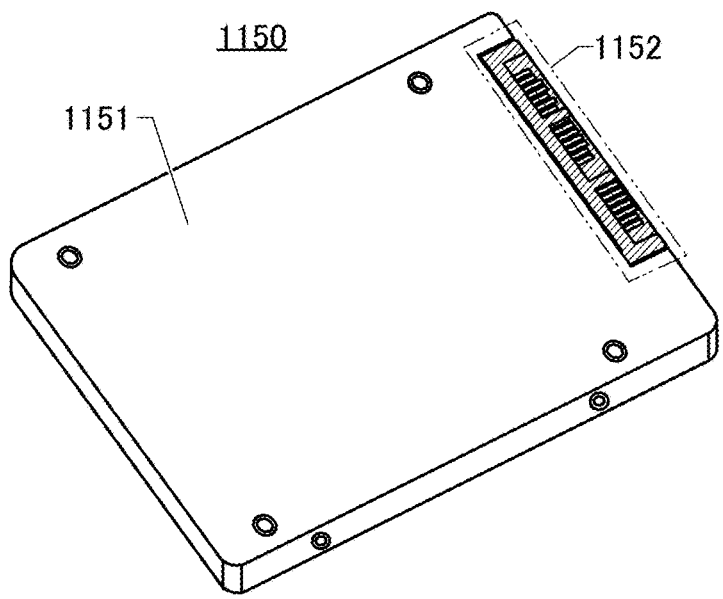
Figure 12E:
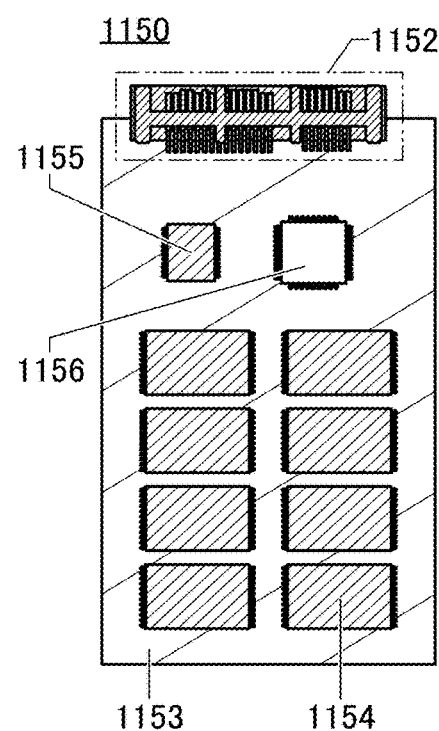

FIG. 12D is a schematic external diagram of an SSD, and FIG. 12E is a schematic diagram of the internal structure of the SSD. An SSD 1150 includes a housing 1151, a connector 1152, and a substrate 1153. The substrate 1153 is held in the housing 1151. The substrate 1153 is provided with a memory chip 1154, a memory chip 1155, and a controller chip 1156, for example. The memory chip 1155 is a work memory of the controller chip 1156, and a DOSRAM chip can be used, for example. When the memory chip 1154 is also provided on the back side of the substrate 1153, the capacity of the SSD 1150 can be increased. The semiconductor device described in the above embodiment can be incorporated in the memory chip 1154 or the like on the substrate 1153.

This embodiment can be implemented in combination with any of the structures described in the other embodiments and the like, as appropriate.

Embodiment 4

FIG. 13 illustrates specific examples of electronic devices including the semiconductor device of one embodiment of the present invention.

<Electronic Device and System>

The semiconductor device of one embodiment of the present invention can be mounted on a variety of electronic devices. Examples of electronic devices include a digital camera, a digital video camera, a digital photo frame, an e-book reader, a mobile phone, a portable game machine, a portable information terminal, and an audio reproducing device in addition to electronic devices provided with a relatively large screen, such as a television device, a monitor for a desktop or notebook information terminal or the like, digital signage, and a large game machine like a pachinko machine. In addition, the semiconductor device of one embodiment of the present invention can be used as a component of artificial intelligence. With use of the semiconductor device of one embodiment of the present invention, artificial intelligence can be included in the electronic device.

The electronic device of one embodiment of the present invention may include an antenna. When a signal is received by the antenna, a video, data, or the like can be displayed on a display portion. When the electronic device includes an antenna and a secondary battery, the antenna may be used for contactless power transmission.

The electronic device of one embodiment of the present invention may include a sensor (a sensor having a function of measuring force, displacement, position, speed, acceleration, angular velocity, rotational frequency, distance, light, liquid, magnetism, temperature, a chemical substance, sound, time, hardness, an electric field, current, voltage, power, radioactive rays, flow rate, humidity, a gradient, oscillation, odor, or infrared rays).

The electronic device of one embodiment of the present invention can have a variety of functions. For example, the electronic device can have a function of displaying a variety of data (e.g., a still image, a moving image, and a text image) on the display portion, a touch panel function, a function of displaying a calendar, date, time, and the like, a function of executing a variety of software (programs), a wireless communication function, and a function of reading out a program or data stored in a recording medium.

[Information Terminal]

Figure 13A:
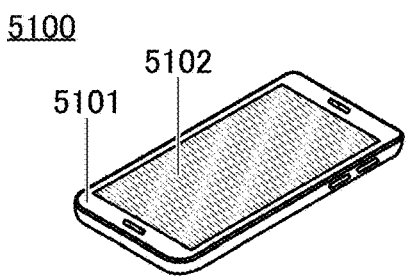
FIG. 13A to FIG. 13H illustrate electronic devices.

FIG. 13A illustrates a mobile phone (a smartphone), which is a type of information terminal. An information terminal 5100 includes a housing 5101 and a display portion 5102. As input interfaces, a touch panel is provided in the display portion 5102, and a button is provided in the housing 5101.

The information terminal 5100 can execute an application utilizing artificial intelligence by using the semiconductor device of one embodiment of the present invention. Examples of the application utilizing artificial intelligence include an application for recognizing a conversation and displaying the content of the conversation on the display portion 5102; an application for recognizing letters, figures, and the like input to the touch panel of the display portion 5102 by a user and displaying them on the display portion 5102; and an application for performing biometric authentication using fingerprints, voice prints, or the like.

Figure 13B:
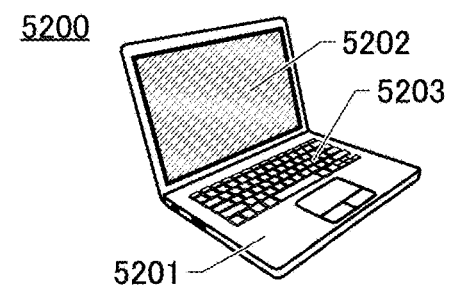

FIG. 13B illustrates a notebook information terminal 5200. The notebook information terminal 5200 includes a main body 5201 of the information terminal, a display portion 5202, and a keyboard 5203.

Like the information terminal 5100 described above, the notebook information terminal 5200 can execute an application utilizing artificial intelligence by using the semiconductor device of one embodiment of the present invention. Examples of the application utilizing artificial intelligence include design-support software, text correction software, and software for automatic menu generation. Furthermore, with the use of the notebook information terminal 5200, novel artificial intelligence can be developed.

Note that although FIG. 13A and FIG. 13B show a smartphone and a notebook information terminal, respectively, as examples of the electronic device in the above description, an information terminal other than a smartphone and a notebook information terminal can be used. Examples of information terminals other than a smartphone and a notebook information terminal include a PDA (Personal Digital Assistant), a desktop information terminal, and a workstation.

[Game Machines]

Figure 13C:
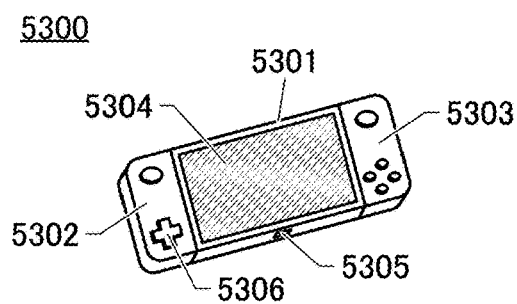

FIG. 13C shows a portable game machine 5300 as an example of a game machine. The portable game machine 5300 includes a housing 5301, a housing 5302, a housing 5303, a display portion 5304, a connection portion 5305, an operation key 5306, and the like. The housing 5302 and the housing 5303 can be detached from the housing 5301. When the connection portion 5305 provided in the housing 5301 is attached to another housing (not illustrated), an image to be output to the display portion 5304 can be output to another video device (not illustrated). In that case, the housing 5302 and the housing 5303 can each function as an operating unit. Thus, a plurality of players can play a game at the same time. The semiconductor device of one embodiment of the present invention can be incorporated into a chip provided on a substrate in the housing 5301, the housing 5302, and the housing 5303, for example.

Figure 13D:
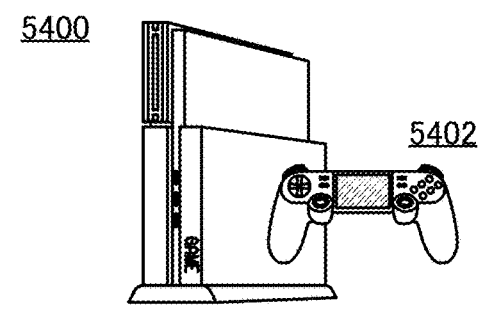

FIG. 13D shows a stationary game machine 5400 as an example of a game machine. A controller 5402 is wired or connected wirelessly to the stationary game machine 5400.

Using the GPU or the chip, which is the semiconductor device of one embodiment of the present invention, in a game machine such as the portable game machine 5300 and the stationary game machine 5400 achieves a low-power-consumption game machine. Moreover, heat generated from a circuit is reduced owing to low power consumption; thus, the influence of heat generation on the circuit, a peripheral circuit, and a module can be reduced.

Furthermore, when the semiconductor device of one embodiment of the present invention is used in the portable game machine 5300, the portable game machine 5300 including artificial intelligence can be achieved.

In general, the progress of a game, the actions and words of game characters, and expressions of an event and the like occurring in the game are determined by the program in the game; however, the use of artificial intelligence in the portable game machine 5300 enables expressions not limited by the game program. For example, variations in questions posed by the player, the progress of the game, time, and the actions and words of the game characters can be expressed.

In addition, when a game requiring a plurality of players is played on the portable game machine 5300, the artificial intelligence can create a virtual game player; thus, the game can be played alone with the game player created by the artificial intelligence as an opponent.

Although the portable game machine and the stationary game machine are shown as examples of game machines in FIG. 13C and FIG. 13D, the game machine capable of using the semiconductor device of one embodiment of the present invention is not limited thereto.

Examples of the game machine using the semiconductor device of one embodiment of the present invention include an arcade game machine installed in entertainment facilities (a game center, an amusement park, and the like), and a throwing machine for batting practice installed in sports facilities.

[Large Computer]

The semiconductor device of one embodiment of the present invention can be used in a large computer.

Figure 13E:
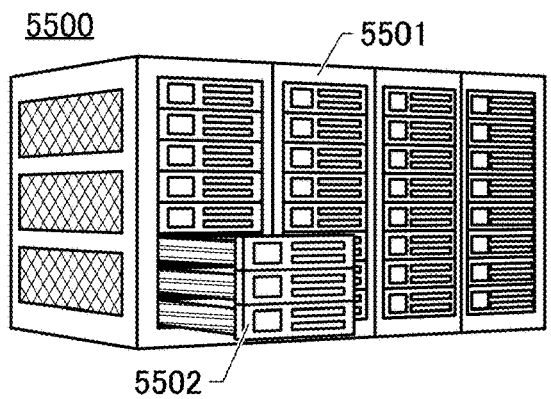
Figure 13F:
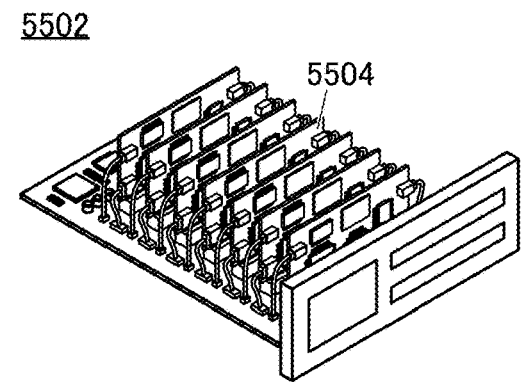

FIG. 13E shows a supercomputer 5500 as an example of a large computer. FIG. 13F shows a rack-mount computer 5502 included in the supercomputer 5500.

The supercomputer 5500 includes a rack 5501 and a plurality of rack-mount computers 5502. The plurality of computers 5502 are stored in the rack 5501. The computer 5502 includes a plurality of substrates 5504 on which the semiconductor device of one embodiment of the present invention can be mounted.

The supercomputer 5500 is a large computer mainly used for scientific computation. In scientific computation, an enormous amount of arithmetic operation needs to be processed at high speed; hence, power consumption is high and chips generate a large amount of heat. Using the semiconductor device of one embodiment of the present invention in the supercomputer 5500 achieves a low-power-consumption supercomputer. Moreover, heat generation from a circuit can be reduced owing to low power consumption of the supercomputer; thus, the influence of heat generation on the circuit, a peripheral circuit, and a module can be reduced.

Although a supercomputer is shown as an example of a large computer in FIG. 13E and FIG. 13F, a large computer using the semiconductor device of one embodiment of the present invention is not limited thereto. Examples of a large computer using the semiconductor device of one embodiment of the present invention include a computer that provides service (a server) and a large general-purpose computer (a mainframe).

[Moving Vehicle]

The semiconductor device of one embodiment of the present invention can be used in an automobile, which is a moving vehicle, and around a driver's seat in the automobile.

Figure 13G:
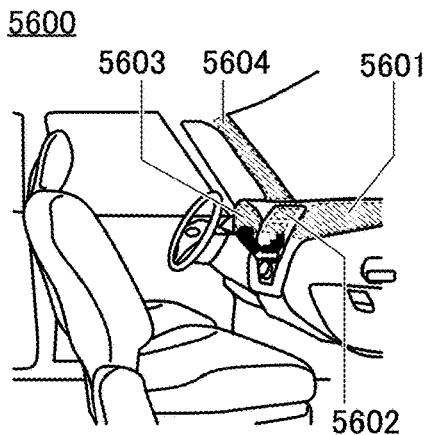

FIG. 13G shows an area around a windshield inside an automobile 5600, which is an example of a moving vehicle. FIG. 13G illustrates a display panel 5601, a display panel 5602, and a display panel 5603 that are attached to a dashboard and a display panel 5604 that is attached to a pillar.

The display panel 5601 to the display panel 5603 can provide a variety of information by displaying a speedometer, a tachometer, mileage, a fuel gauge, a gear state, air-condition setting, and the like. In addition, the content, layout, or the like of the display on the display panels can be changed as appropriate to suit the user's preference, so that the design quality can be increased. The display panel 5601 to the display panel 5603 can also be used as lighting devices.

The display panel 5604 can compensate for the view obstructed by the pillar (a blind spot) by showing a video taken by an imaging device (not illustrated) provided on the automobile. That is, displaying an image taken by the imaging device provided outside the automobile leads to compensation for the blind spot and an increase in safety. In addition, displaying an image to compensate for a portion that cannot be seen makes it possible for the driver to confirm the safety more naturally and comfortably. The display panel 5604 can also be used as a lighting device.

Since the semiconductor device of one embodiment of the present invention can be used as a component of artificial intelligence, the chip can be used for an automatic driving system of the automobile, for example. The chip can also be used for a system for navigation, risk prediction, or the like. A structure may be employed in which the display panel 5601 to the display panel 5604 display navigation information, risk prediction information, or the like.

Note that although an automobile is described above as an example of a moving vehicle, the moving vehicle is not limited to an automobile. Examples of the moving vehicle include a train, a monorail train, a ship, and a flying vehicle (a helicopter, an unmanned aircraft (a drone), an airplane, and a rocket), and these moving vehicles can each include a system utilizing artificial intelligence when the semiconductor device of one embodiment of the present invention is used in these moving vehicles.

[Household Appliance]

Figure 13H:
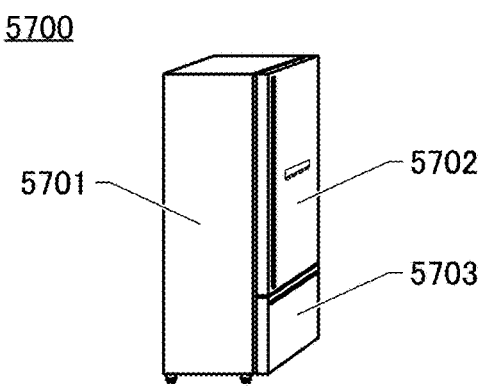

FIG. 13H shows an electric refrigerator-freezer 5700 as an example of a household appliance. The electric refrigerator-freezer 5700 includes a housing 5701, a refrigerator door 5702, a freezer door 5703, and the like.

When the semiconductor device of one embodiment of the present invention is used in the electric refrigerator-freezer 5700, the electric refrigerator-freezer 5700 including artificial intelligence can be achieved. Utilizing the artificial intelligence enables the electric refrigerator-freezer 5700 to have a function of automatically making a menu based on foods stored in the electric refrigerator-freezer 5700, expiration dates of the foods, or the like, a function of automatically adjusting temperature to be appropriate for the foods stored in the electric refrigerator-freezer 5700, and the like.

Although the electric refrigerator-freezer is described as an example of a household appliance, examples of other household appliances include a vacuum cleaner, a microwave oven, an electronic oven, a rice cooker, a water heater, an IH cooker, a water server, a heating-cooling combination appliance such as an air conditioner, a washing machine, a drying machine, and an audio visual appliance.

The electronic devices, the functions of the electronic devices, the application examples of artificial intelligence, their effects, and the like described in this embodiment can be combined as appropriate with the description of another electronic device.

This embodiment can be implemented in appropriate combination with the structures described in the other embodiments and the like.

REFERENCE NUMERALS

10: memory cell, 110: transistor, 120: transistor, 130: capacitor, 200: semiconductor device, 210: driver circuit, 211: peripheral circuit, 212: control circuit, 215: peripheral circuit, 220: memory array, 221: row decoder, 222: column decoder, 223: row driver, 224: column driver, 225: input circuit, 226: output circuit, 227: sense amplifier, 228: voltage generation circuit, 241: PSW, 242: PSW

The invention claimed is:

1. A memory cell comprising:
a first wiring;
a first transistor comprising a first gate over the first wiring, a first oxide semiconductor over the first gate, a first source and a first drain electrically connected to the first oxide semiconductor, and a second gate over the first oxide semiconductor;
a second transistor comprising a third gate over the second gate, a second oxide semiconductor over the third gate, a second source and a second drain electrically connected to the second oxide semiconductor, and a fourth gate over the second oxide semiconductor;
a second wiring over the fourth gate; and
a capacitor,
wherein one of the first source and the first drain is electrically connected to the first wiring,
wherein one of the second source and the second drain is electrically connected to the second wiring,
wherein the other of the second source and the second drain is electrically connected to the second gate and a first electrode of the capacitor,
wherein data is configured to be written to the memory cell through the second wiring, and
wherein data held in the memory cell is configured to be read out through the first wiring.

2. The memory cell according to claim 1, wherein the first oxide semiconductor comprises at least one of indium and zinc.

3. The memory cell according to claim 1, wherein the second oxide semiconductor comprises at least one of indium and zinc.

4. The memory cell according to claim 1, wherein a channel length of the first transistor is longer than a channel length of the second transistor.

5. The memory device according to claim 1, wherein a channel formation region of the first transistor and a channel formation region of the second transistor do not overlap with each other.

6. A memory device comprising:
a plurality of memory cells comprising the memory cell according to claim 1; and
m first wirings and n second wirings,
wherein the plurality of memory cells are arranged in a matrix of m rows and n columns,
wherein the i-th first wiring is electrically connected to the i-th memory cell,
wherein the j-th second wiring is electrically connected to the j-th memory cell, and
wherein each of m and n is an integer greater than or equal to 2, i is an integer greater than or equal to 1 and less than or equal to m, and j is an integer greater than or equal to 1 and less than or equal to n.

7. A memory cell comprising:
a first wiring;
a first transistor comprising a first gate over the first wiring, a first oxide semiconductor over the first gate, a first source and a first drain electrically connected to the first oxide semiconductor, and a second gate over the first oxide semiconductor;
a second transistor comprising a third gate over the second gate, a second oxide semiconductor over the third gate, a second source and a second drain electrically connected to the second oxide semiconductor, and a fourth gate over the second oxide semiconductor;
a second wiring over the fourth gate;
a third wiring on a same plane as the third gate; and
a capacitor,
wherein one of the first source and the first drain is electrically connected to the first wiring,
wherein one of the second source and the second drain is electrically connected to the second wiring,
wherein the other of the first source and the first drain is electrically connected to the third wiring,
wherein the other of the second source and the second drain is electrically connected to the second gate and a first electrode of the capacitor,
wherein the first oxide semiconductor comprises a channel formation region comprising at least one of indium and zinc,
wherein the second oxide semiconductor comprises a channel formation region comprising at least one of indium and zinc,
wherein data is configured to be written to the memory cell through the second wiring, and
wherein data held in the memory cell is configured to be read out through the first wiring.

8. The memory cell according to claim 7, wherein a channel length of the first transistor is longer than a channel length of the second transistor.

9. The memory device according to claim 7, wherein the channel formation region of the first transistor and the channel formation region of the second transistor do not overlap with each other.

10. A memory device comprising:
a plurality of memory cells comprising the memory cell according to claim 7; and
m first wirings and n second wirings,
wherein the plurality of memory cells are arranged in a matrix of m rows and n columns,
wherein the i-th first wiring is electrically connected to the i-th memory cell,
wherein the j-th second wiring is electrically connected to the j-th memory cell, and
wherein each of m and n is an integer greater than or equal to 2, i is an integer greater than or equal to 1 and less than or equal to m, and j is an integer greater than or equal to 1 and less than or equal to n.

* * * * *